United States Patent
Morgan, Jr. et al.

(10) Patent No.: US 6,766,327 B2
(45) Date of Patent: Jul. 20, 2004

(54) DATA LINKING SYSTEM AND METHOD USING ENCODED LINKS

(75) Inventors: Charles D. Morgan, Jr., Little Rock, AR (US); John R. Talburt, Cabot, AR (US); Shawn G. Harvey, Little Rock, AR (US); Terry M. Talley, Conway, AR (US); Walter E. Anderson, Little Rock, AR (US); Samuel Kenton Welch, Conway, AR (US); C. Stuart White, Conway, AR (US)

(73) Assignee: Acxiom Corporation, Little Rock, AR (US)

( * ) Notice: Subject to any disclaimer, the term of this patent is extended or adjusted under 35 U.S.C. 154(b) by 0 days.

(21) Appl. No.: 10/217,059

(22) Filed: Aug. 12, 2002

(65) Prior Publication Data

US 2003/0135512 A1 Jul. 17, 2003

Related U.S. Application Data

(63) Continuation-in-part of application No. 09/469,096, filed on Dec. 21, 1999, now Pat. No. 6,523,041, which is a continuation-in-part of application No. 08/902,567, filed on Jul. 29, 1997, now Pat. No. 6,073,140.

(51) Int. Cl.$^7$ .............................................. G06F 17/30
(52) U.S. Cl. ....................................... 707/101; 707/102
(58) Field of Search ............................... 707/2, 3, 4, 5, 707/6, 8, 10, 100, 101, 102, 103 R; 705/16, 27, 37; 709/227, 246, 203

(56) References Cited

U.S. PATENT DOCUMENTS

| | | | | |
|---|---|---|---|---|
| 5,754,772 A | * | 5/1998 | Leaf | 709/203 |
| 5,960,428 A | | 9/1999 | Lindsay et al. | 707/4 |
| 6,003,024 A | | 12/1999 | Bair et al. | 707/3 |
| 6,058,378 A | * | 5/2000 | Clark et al. | 705/37 |
| 6,073,140 A | * | 6/2000 | Morgan et al. | 707/203 |
| 6,523,041 B1 | * | 2/2003 | Morgan et al. | 707/102 |

FOREIGN PATENT DOCUMENTS

EP   1148430 A   10/2001

OTHER PUBLICATIONS

Ralph Kimball: "The Data Warehouse Lifecycle Toolkit Passage," Data Warehouse Lifecycle Toolkit, pp. 180–293 XP002243859.
Ralph Kimball: "The Data Warehouse Toolkit Passage," Data Warehouse Toolkit, pp. 100–106 XP002243860.

* cited by examiner

*Primary Examiner*—Diane D. Mizrahi
*Assistant Examiner*—Apu M Mofiz
(74) *Attorney, Agent, or Firm*—J. Charles Dougherty

(57) ABSTRACT

A method for linking data using persistent links is disclosed. The links are created in a central repository, which maintains an identification class for each entity. The identification class contains all available information concerning the entity. By matching links instead of names and addresses, potential ambiguities and erroneous duplicates are eliminated. The links are encoded before external distribution with a client-specific key; the link encoding discourages clients from collaborating to use personal information without authorization.

28 Claims, 17 Drawing Sheets

| Data | Consumer Token | Address Token | Occupancy Token |
|---|---|---|---|
| John Doe 10 Oak Street Denver, CO | 100 | 350 | 111 |
| Jane Doe 10 Oak Street Denver, CO | 200 | 350 | 222 |
| John Doe 123 S. Hampton Miami, FL | 100 | 800 | 333 |
| Jane Doe 123 S. Hampton Miami, FL | 200 | 800 | 444 |

Fig. 2

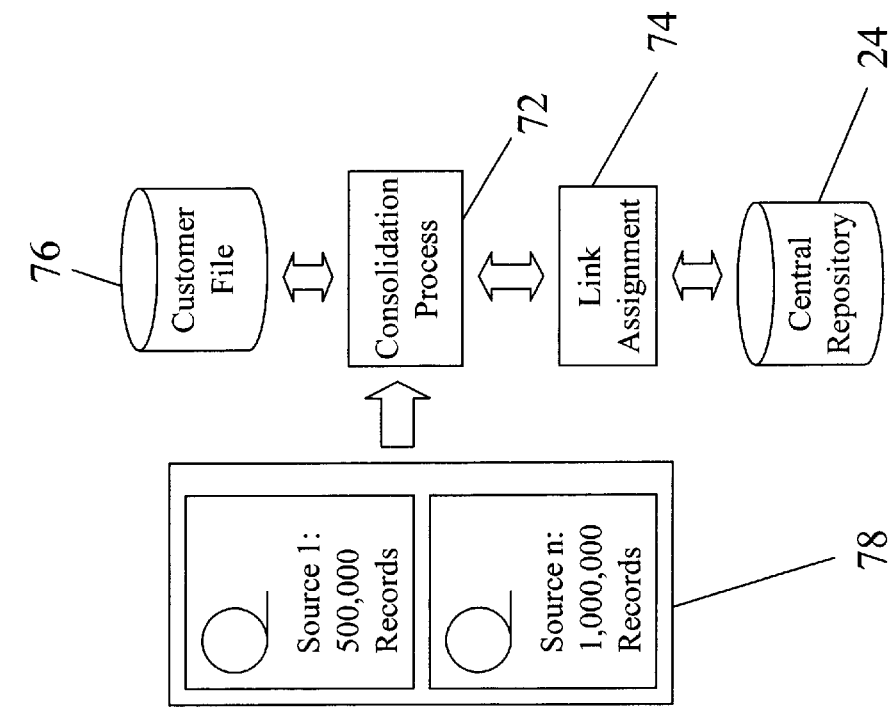
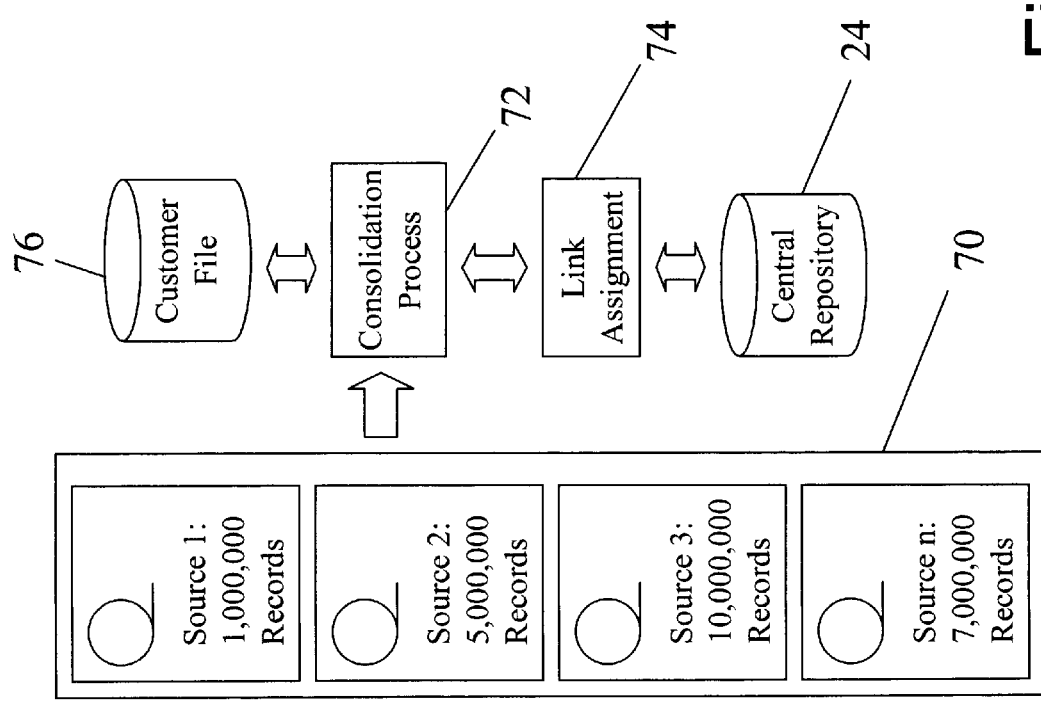
Fig. 9

| System of Record | Name | Address | Account Number | Date Updated |
|---|---|---|---|---|
| Automotive Services | Bill Smith | 978 Frankfort, Franklin, TN | 111-1111 | 06/17/95 |
| Home Services | William F Smith | 10 Oak Street, Jacksonville Florida | 222222-33 | 02/25/99 |
| Retail Sales | Frank Smith | 978 Frankfort, Franklin TN | 777-998-777 | 08/14/97 |
| Sporting Goods Special Mailing List | Spud Smith | 22 Chamberlin Dr, Apt 110, Jacksonville FL | 333-22222222 | 12/15/98 |

| Consumer Token | Address Token | System of Record | Name | Address | Account Number |
|---|---|---|---|---|---|
| J269US0269357485 | J269US03P8569145 | Automotive Services | Bill Smith | 978 Frankfort, Franklin, TN | 111-1111 |
| J269US0269357485 | J269US035W896347 | Home Services | William F Smith | 10 Oak Street, Jacksonville FL | 222222-33 |
| J269US0269357485 | J269US03P8569145 | Retail Sales | Frank Smith | 978 Frankfort, Franklin TN | 777-998-777 |
| J269US0269357485 | J269US03586R8456 | Sporting Goods Special Mailing List | Spud Smith | 22 Chamberlin Dr, Apt 110, Jacksonville FL | 333-22222222 |

DATA LINKING SYSTEM AND METHOD USING ENCODED LINKS

This Application is a Continuation-in-part of application Ser. No. 09/469,096 filed Dec. 21, 1999 now U.S. Pat. No. 6,523,041 which is a Continuation-in-part of application Ser. No. 08/902,569 filed Jul. 29, 1997 now U.S. Pat. No. 6,073,140.

FIELD OF THE INVENTION

The invention is directed to a system and method for linking data that pertains to like entities. In particular, the invention is directed to a system and method for linking data where the links are encoded to discourage collusion by entities to whom the links are issued.

BACKGROUND OF THE INVENTION

Virtually all businesses today find it necessary to keep computerized databases containing information about their customers. Such information can be used in a variety of ways, such as for billing, and for keeping consumers informed as to sales and new products. This information is typically stored electronically as a series of records in a computer database, each record pertaining to a particular customer. Records are logical constructs that may be implemented in a computer database in any number of ways well known in the art. The database used may be flat, relational, or may take any one of several other known forms. Each record in the database may contain various fields, such as the customer's first name, last name, street address, city, state, and zip code. The records may also include more complex demographic data, such as the customer's marital status, estimated income, hobbies, or purchasing history.

Businesses generally gather customer data from a multitude of sources. These sources may be internal, such as customer purchases, or external, such as data provided by information service providers. A number of information service providers maintain large databases with broad-based consumer information that can be sold or leased to businesses; for example, a catalog-based retail business may purchase a list of potential customers in a specific geographic area.

Because businesses use varying methods to collect customer data, they often find themselves with several large but entirely independent databases that contain redundant information about their customers. These businesses have no means by which to accurately link all of the information concerning a particular customer. One common example of this problem is a bank that maintains a database for checking and savings account holders, a separate database for credit card holders, and a separate database for investment clients. Another common example is a large retailer that has separate databases supporting each of its divisions or business lines, which may include, for example, automotive repair, home improvement, traditional retail sales, e-commerce, and optometry services.

Businesses with multiple, independent databases may find it particularly valuable to know who among their customers come to them for multiple services. For example, a bank may wish to offer an enhanced suite of banking services to a customer that maintains only $100 in his or her savings account, if the bank could also determine that this same individual maintains a $100,000 brokerage account. This information could also be valuable, for example, to take advantage of cross-selling opportunities and to assist the business in optimizing the mix of services to best serve its existing customer base.

Linking all available data concerning each customer would also allow each of the business's divisions to have access to the most up-to-date information concerning each customer. For example, a customer may get married and relocate, then notify only one of the business's divisions concerning the change. Suppose that Sue Smith, a long-time and valued customer residing in Memphis, becomes Sue Thompson, residing in Minneapolis. If only one of the business's data processing systems "knows" about the change, the other systems would be unable to determine that Sue Thompson in Minneapolis is the same person as Sue Smith in Memphis. This problem may prevent the business from treating a customer as befitting that customer's value to the business. Treating a long-time customer as if she were a new customer would likely be found insulting, and may even result in a loss of that customer's business.

One of the oldest methods used to combat this problem is simply to assign a number to every customer, and then perform matching, searching, and data manipulation operations using that number. Many companies that maintain large, internal customer databases have implemented this type of system. In theory, each customer number always stays the same for each customer, even when that customer changes his or her name or address. These numbers may be used internally, for example, for billing and for tracking packages shipped to that customer. The use of a customer identification number eliminates the potential ambiguities if, for example, the customer's name and address were instead used as identifiers. Financial institutions in particular have used personal identification numbers (PINs) to unambiguously identify the proper customer to which each transaction pertains.

Customer number systems are inherently limited to certain applications. Customer identification numbers are not intended to manage a constantly changing, nationwide, comprehensive list of names and addresses. Companies maintaining these numbers are generally only interested in keeping up with their own customers. Thus the assignment process for such numbers is quite simple—when a customer approaches the company seeking to do business, a new number is assigned to that customer. The customer numbers are not the result of a broad-based process capable of managing the address and name history for a given customer. Significantly, the customer numbers are assigned based only on information presented to the business creating the numbers by the customers themselves. The numbers are not assigned from a multi-sourced data repository that functions independently of the company's day-to-day transactions. In short, the purpose of such numbers is simply transaction management, not universal data linkage. Such numbers are also not truly persistent, since they are typically retired by the company after a period of inactivity. Again, since the focus of the customer number assignment scheme is merely internal business transactions, there is no reason to persistently maintain a number for which no transactions are ongoing. These numbers cannot be used externally to link data because every company maintains a different set of customer numbers.

Although externally applied universal numbering systems have not been used for consumers, they have been made publicly available for use with retail products. The universal product code (UPC) system, popularly known as "bar codes," began in the early 1970's when a need was seen in the grocery industry for a coding system that was common to all manufacturers. Today, the Uniform Code Council, Inc. (UCC) is responsible for assigning all bar codes for use with retail products, thereby maintaining a unique UPC number for every product regardless of the manufacturer. A database of these codes is made publicly available so that the codes can be used by everyone. Using this database, every retailer can track price and other information about each product sitting on its shelves. Today's product distribution chains also rely heavily on the UPC system to track products and make determinations concerning logistics and distribution channels.

While the UPC system has been enormously successful, the system's usefulness is limited. To obtain a UPC number for a new product, a manufacturer first applies for a UPC number, the product and number are added to the UCC database, and then the manufacturer applies the proper bar coding to its products before they are distributed. There is no scheme for assigning UPC numbers to pre-existing products, and no scheme for matching UPC numbers to the products they represent. Also, since each UPC number represents a single, distinct item packaged for retail sale, there is no scheme for identifying the various elements of a particular product to which a single UPC number is assigned. The UPC system thus could not be used to link various pre-existing data pertaining to consumers.

A final but vitally important issue raised by the use of any identification number system with respect to individuals is privacy. A company's internal-only use of a customer identification number raises few privacy concerns. But the external use of a customer number or PIN with respect to an individual increases the risk that the individual's private data may be used or shared with others in an unauthorized or illegal manner. This problem is of particular concern in the case of an information services provider that issued customer identification numbers or PINs as a means of tracking data on its clients' customer databases. Such companies typically have a large number of clients, many of whom may have substantially overlapping customer lists. These clients may wish to surreptitiously share their data with each other in order to gain more information about their own customers. Such clients might find it relatively simple to merge or otherwise use their customer databases in a collective manner based on simple matching of customer information numbers. If clients were to collude in such an effort, the information services provider would no longer be able to control how the information is being used or shared. The information services provider's clients could thus circumvent whatever protections the information services provider might have put in place to prevent the misuse of personal information.

Another limitation of customer identification number systems is the method used to merge files and eliminate duplicate entries. The only comprehensive method to eliminate duplicates in such systems and link (or "integrate") customer data maintained on separate databases has historically been to rebuild the relevant databases from scratch. Since many such databases contain tens of millions of records, the cost of completely rebuilding the databases is often prohibitively expensive. In addition, these databases are constantly in flux as old customers leave, new customers take their place, and customer information changes; thus the rebuild procedure must be periodically repeated to keep all information reasonably current.

Businesses have traditionally turned to information service providers for data integration and duplicate elimination services. The information services industry has devoted enormous resources in recent years to developing various "deduping" solutions. These solutions are performed after-the-fact, that is, after the instantiation of the duplicate entries within the data owner's system. To determine if data records for Sue Smith in Memphis and Sue Thompson in Minneapolis pertain to the same person, a deduping routine may analyze a myriad of data fields; simply comparing names and addresses will fail to achieve a match in many cases. Even in the case where the name and address are the same, this may not indicate that the records pertain to the same individual, since, for example, the data may pertain to a father and his namesake son. The fact that many databases contain largely incomplete or inaccurate data makes this problem even more difficult to effectively solve, and in many cases a complete solution is impossible.

Although deduping routines are necessarily complex, they must also be performed with great speed. These routines are used to dedupe databases having tens of millions of records. With such large databases, the software subroutine that performs the deduping function may be called millions of times during a single deduping session. Thus these subroutines must be executed on very fast, expensive computer equipment that has the necessary power to complete the deduping routine in a reasonable amount of time. Because duplicate elimination is so resource-intensive, such tasks are today performed only by information service providers or data owners that have access to the massive computing power necessary to efficiently perform these routines.

In addition, deduping routines necessarily involve some guesswork. As explained above, duplicate elimination is based on the available data, which may be incomplete. The results of duplicate elimination routines are thus only as good as the available information. Because of the inherent ambiguities in name and address information, no system can eliminate 100% of the duplicates in a customer database; inevitably, the resulting database will contain instances of multiple records for the same customer, and multiple customers merged into one record as if they were a single customer. A well-known result of this problem is the customer who receives several copies of the same catalog from a mail-order retailer. Such experiences are frustrating for the customer and result in increases costs for the retailer.

Historically, the procedure by which an information service provider integrates a business's databases has been time consuming and labor intensive. Since a wide variety of database formats are in use, the information service provider must first convert the database source files to a standard format for processing. The information service provider then runs one of the complex deduping programs as explained above. The data in the business's databases may be augmented with external sources of information to improve the accuracy of the deduping routines. The resulting database file is then reformatted into the business's database file format to complete the process. This entire procedure requires significant direct involvement by the information service provider's technical personnel, which is an important factor in the cost of the service.

A significant limitation of this data integration method is that each time the service is requested, the entire process must be repeated. Data integration cannot be performed for a single record at a time, or for only those records that have been updated. This is because the data integration process depends upon the comparison of all of the data records against each other to establish groupings of similar (and thus possibly duplicate) records. Although matching links are usually created during the comparison process, those links are temporary and are lost once the process is complete. The links must be recreated from scratch each time the service is performed. It would be impossible to reuse these links since they are not unique across the universe of all possible customers, and are not maintained by the information services provider.

One of the most significant limitations of the current data integration method is that it cannot be performed in real time; the process is only performed in batch mode. Real-time data integration would be highly desirable since it would allow a retailer or other data owner to provide an immediate, customized response to input from a particular customer. For example, when a particular customer visits a retailer's web site, it would be desirable to link all available information concerning that customer, and then display a web page that is particularly tailored to that customer's interests and needs. Another application would be to provide customized coupons or sales information in response to the "swiping" of a particular customer's credit card when a retail purchase is in progress.

Prior-art systems to provide a customized response to customer input are based on the matching of internal customer numbers. For example, some grocery stores distribute "member" cards containing bar codes to identify a particular customer. When the customer presents his or her member card at the check-out line, the card's bar code is scanned to determine the customer's identification number. The grocer's data processing system then automatically consults its buying history database in order to print coupons that are tailored to that customer's particular buying habits.

Record-at-a-time processing based on internal customer numbers has several important limitations. First, this system only works for established customers for whom a number has already been assigned. If a new customer enters the store, that customer must be issued a member card (and corresponding customer identification number) before the system will recognize the customer. Initially, the grocer would know nothing about this customer. In addition, this system's use of customer identification numbers would make it unacceptable for use externally, due to the individual privacy concerns discussed above.

Still another limitation of traditional data integration methods is that they provide no means by which a business can remotely and automatically update or "enhance" the data it maintains for each customer when the data concerning that customer changes. The traditional, batch-mode method of providing update or enhancement data is laborious, and may require several weeks from start to finish. First, the company requesting data enhancement is required to build an "extract file" containing an entry for each record in its customer database. This extract file is stored on a computer-readable medium, such as magnetic tape, which is then shipped to the information service provider for enhancement. Since a wide variety of database formats are in use, the information service provider must first convert the extract file to the information service provider's internal format for processing. Using this standardized version of the extract file, the information service provider then executes a software application that compares the information in the company's database against all of the information that the information service provider maintains. The update or enhancement data is then overlaid onto the company's standardized extract file.

An important limitation of this data update and enhancement method is that the business's database must be rebuilt even when it only requires an update to a small portion of the data. For example, a retailer may desire to update the addresses in its customer database once per month. Most customers will not have changed their address within each one-month period; the traditional update method, however, would require the retailer to completely rebuild the database to catch those few customers who have moved.

For all of these reasons, it would be desirable to develop an unambiguous data-linking system that will improve data integration, update, and enhancement; will perform record-at-a-time, real-time data linking; and may be used externally without raising privacy concerns.

SUMMARY OF THE INVENTION

The present invention is directed to a system and method for using persistent links to create an unambiguous linking scheme to match related data. Links may be implemented as unique alphanumeric strings that are used to tag all data pertaining to a particular entity. These links are created by an information services provider, and may be distributed externally for the use of its customers in an encoded form. Unlike the customer identification numbers discussed above, the creation of links is not dependent upon a customer approaching the data owner. The information services provider that creates the links may maintain databases with information pertaining to the entire population of a country or other area of interest, and constantly monitors the population for changes of address, name, status, and other demographic data in order to keep the list of links current. New links are assigned as new entities are identified.

The present invention is further directed to a method of encoding the links. Issuing the same links to a multitude of clients would allow for the possibility of the clients working cooperatively to share information amongst themselves without the involvement of the information services provider. According to the present invention, the links are encoded with a client-specific key before being issued externally. When the information services provider again accesses that particular client's data, the client-specific key will be used to decode the client's links. In this manner, internal processing by the information services provider may always be performed with unencoded links. This encoding scheme will make it difficult for clients to share information in an unauthorized manner. The encoding technique is chosen such that decoding would be a sufficiently difficult task as to render it commercially impractical. In addition, one embodiment of the invention comprises the use of multiple encoding algorithms to make unauthorized sharing of data even more difficult. In a preferred embodiment, the link is divided into various fields, such that only the portion of the field corresponding to a customer's identity need be encoded.

To maintain the uniqueness of each link, the links are created only by a single central repository operated by the information services provider and only used internally by this provider. Because even the information service provider's information will not be complete, it may be necessary to periodically perform link maintenance in the form of combining two or more links into a single link, or splitting a single link into two different links. This process may be performed simply by publishing a list of consolidated and split links that is transmitted to all link users. This maintenance method makes unnecessary the complete reprocessing of a database to keep links current.

Because the links are created at a central repository that is maintained by an information services provider, ambiguities may be resolved far more effectively than in prior art systems. The central repository may create an identification class that contains all available data pertaining to each entity for which information is maintained. The purpose of the identification class is to link all available data concerning a particular entity using the appropriate link. Even though much of this information may never be distributed, it may still be used in the matching process to assure that the correct link is assigned to a customer's data in response to a data integration, update, or enhancement request. The identification class may include name aliases, common name misspellings, last name change history, address history, street aliases, and other relevant information useful for matching purposes. The identification-class structure enables far more accurate matching and "deduping" than previously possible; for example, by using known name aliases, the central repository may recognize that a customer's separate database records for "Sue C. Smith," "Carol Smith," and "Sue Thompson" each actually refer to the same person, and would accurately assign a single link to link all relevant information about this person.

Since the links are persistent and are universally unique within a domain, they are not limited to use by a particular data provider, or to a particular matching session; instead, the links are specifically intended for external distribution to any owner of relevant data, and will never expire. Once a data owner receives the links and matches them to its existing data, the links can be used to rapidly compare, match, search, and integrate data from multiple internal databases, either in batch mode or real time, using as few as one record at a time.

Different types of links may be used to link data relevant to, for example, individual customers, businesses, addresses, households, and occupancies. An occupancy link pertains to information about a customer or business and the address at which that particular customer resides at a particular time. A household link pertains to information about all persons who are determined to share a household. The definition of what constitutes a "household" may vary from one application to another; therefore, there may be multiple types of household links in use simultaneously. A series of linked address links can further be used to maintain an individual's address history. Using an address history, ambiguities caused by name similarity between individuals may be more easily resolved, and the correct link will be tagged to that individual's data despite a change in address.

As noted above, prior art "deduping" routines are complex, resource-intensive, and, because they are limited to the available data, cannot perform with 100% accuracy. With the present invention, however, adding new data to a data processing system is as simple as matching links against one another. Link matching is a computationally simple process that can be performed as the data is added to the data processing system in real time.

The present invention also uses links to greatly simplify the process of data integration where multiple databases are maintained. When all known information about a particular entity is required, the data owner need only search each database for information that is linked by the link associated with the entity of interest. There is no need to perform complex matching algorithms designed to determine whether, for example, two customers about whom information is maintained on separate databases are in fact the same individual. The links thus enable the data owner to treat each of its physically remote databases as if they were collectively a single "virtual" database in which all information about a particular entity is readily accessible.

The use of links for linking data also significantly reduces the privacy concerns related to data enhancement, data integration, and related data processing. Once the appropriate links are matched to the data owner's data, update and enhancement requests may be transmitted to an information services provider as simply a list of links. The links themselves contain no information concerning the data to which they pertain. Thus anyone who clandestinely intercepts such a transmission would be unable to extract any private data from the transmission. In addition, since the links are merely data links, and not PINs or customer identification numbers, there is no increased individual-privacy risk associated with the external use of the links.

The links further allow real-time, record-at-a-time linking for the immediate collection of all relevant data in response to customer input. By collecting all data for a particular customer, the data owner is able to construct a "total customer view" that may be used, for example, to customize the interaction between the data owner and its customer. If multiple databases must be consulted to retrieve all relevant customer data, then each database need only be searched for data linked to the relevant link. The data owner can use the links to link all of its own data, or can link with data maintained by an information services provider to immediately enhance its data pertaining to a particular customer. Because the linking process is performed just at the moment when the customer input is received, the data retrieved will be the most recently updated customer information available. The linkage between the data owner's database and information provider's database may be by OLTP (on-line transactional processing) using the links. This linkage may also be used to perform "trigger notification." Trigger notification is the automatic triggering of update messages to every linked database when new information is received about a particular entity. Using links, trigger notification may taken place almost instantaneously, allowing, for example, every division of a large retailer to take advantage of the latest information received from a customer.

Another advantage of the record-at-a-time processing is that data may be "pushed" from the information services provider to its customers. For example, the information services provider may learn that a particular individual's name has changed. This change can be "pushed" to a customer's database automatically through the use of a message that contains the new information and the link used to link all data pertaining to this individual. Because the update process requires only the matching of links, the process may be performed automatically without direct intervention by either the information services provider or its customer.

One concern that arises in connection with an information service provider's external distribution of data is the inadvertent distribution of one company's data to that company's competitor. For example, company A may wish to have links applied to its data for one of many reasons. The information service provider may already have information in its matching database about company A's customers that was obtained from company B, company A's competitor. The information services provider must be able to assure company B that its private data will not be shared with company A. The use of links in the present invention makes this "screening" process automatic. The information services provider may use the data of both companies as part of its internal link creation and linkage processes. But by returning only the information received from a company along with the links, the company receiving the links does not obtain anyone's data but its own. Because the links themselves reveal no private company information, there is no requirement to implement a separate "screening" function. Also, because the information service provider uses all available data to generate and append the links, the correct links may still be distributed to companies with incomplete or partially inaccurate data.

It is therefore an object of the present invention to provide a data processing system using persistent links.

It is a further object of the present invention to provide a data processing system using links that are universally unique.

It is a still further object of the present invention to provide for the integration of data across multiple internal databases using links.

It is also an object of the present invention to provide for automatic duplicate elimination on a database using links.

It is another object of the present invention to provide for data update and enhancement using links.

It is still another object of the present invention to provide for the encoding of links with a client-specific key.

It is still another object of the present invention to provide a plurality of encoding algorithms for links provided to different clients.

It is still another object of the present invention to provide real-time, record-at-a-time processing of data using links.

It is still another object of the present invention to provide linkage capability for the creation of a total customer view from physically separate databases in real time using links.

It is still another object of the present invention to create a customized response to customer input in real time using links.

It is still another object of the present invention to perform trigger notification using links.

It is still another object of the present invention to automatically push update data from a central repository to a customer database using links.

Further objects and advantages of the present invention will be apparent from a consideration of the following detailed description of the preferred embodiments in conjunction with the appended drawings as briefly described following.

BRIEF DESCRIPTION OF THE DRAWINGS

FIG. 2 is a table illustrating the relationship between customer, address, and occupancy links according to a preferred embodiment of the present invention.

FIG. 9 is a diagram illustrating the difference between processing an initial assignment of links to a customer database and a subsequent update of link information to the same database according to a preferred embodiment of the present invention.

FIG. 10 is a table of typical data for a retailer with several business divisions prior to tagging with links according to a preferred embodiment of the present invention.

FIG. 11 is a table of typical data for a retailer with several business divisions after tagging with links according to a preferred embodiment of the present invention.

DETAILED DESCRIPTION OF THE PREFERRED EMBODIMENTS

Figure 1:
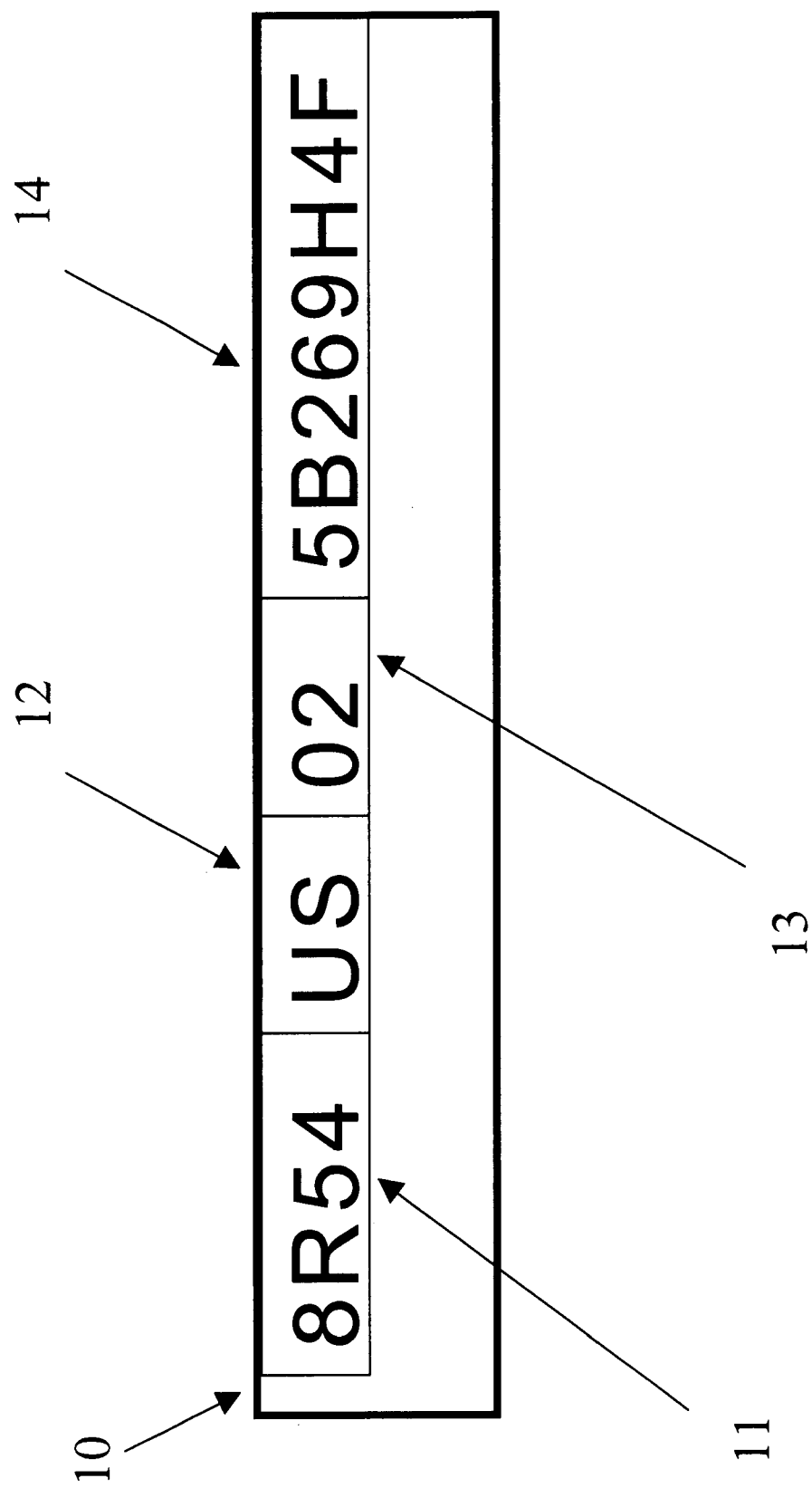
FIG. 1 is a diagram showing the structure of the links according to a preferred embodiment of the present invention.

Referring now to FIG. 1, the structure of the links used in a preferred embodiment of the invention is shown. Each link 10 may be stored electronically as a sixteen-digit alphanumeric character string. Link 10 is made up of four components: domain 11, which is stored as four characters; country code 12, which is stored as two characters; type code 13, which is stored as two characters; and link identifier 14, which is stored as eight characters.

Domain 11 represents a unique client number that is assigned by the information services provider for each client. Because each domain 11 is unique for a particular client, it may be used as a pointer to a client-specific encoding key. The unique client number of domain 11 is preferably stored in the form of four base-32 characters. There are thus 1,048,576 possible unique values for domain 11, which represents the total number of clients that can be handled by an information services provider using this preferred embodiment of the invention without any risk of two clients having matching sets of encoded keys. In a preferred embodiment, one value of domain 11 (for example, a null value of "0000") represents the information service provider itself, and is used for links 10 that are being used internally and are thus unencoded.

It should be recognized that even if an information services provider had a number of clients greater than 1,048,576, there would be no prohibition against assigning the same client number to multiple clients. If only every 1,048,576th client has matching sets of links 10, the probability that two such clients would recognize that fact and attempt to share data without authorization is trivially small.

Country code 12 represents a unique, two-character code that corresponds to the country of origin for the input data. These codes correspond to the ISO-2 standard for two-digit country codes. Country code 12 may be important, for example, in order for the information services provider to treat data differently according to the national privacy laws of various countries from which the corresponding data was collected or to which the corresponding data pertains.

Type code 13 represents a two-character code that identifies the type of link that link 10 represents. Type code 13 is preferably stored in the form of two base-32 characters. Thus there are a total of 1,024 possible type code 13 values. In a preferred embodiment, the first digit of type code 13 is used to indicate whether the link 10 in question is maintained or derived (as explained more fully below), and the second digit of type code 13 is used to indicate whether link 10 is a consumer link, address link, occupancy link, household link, or the like. For example, a type code 13 value of "03" may indicate that the corresponding link 10 is a maintained address link.

Link identifier 14 represents an eight-character code that is unique for each entity of a particular type that is tracked by the information services provider. Link identifier 14 is stored in the form of eight base-32 characters, and thus there are a total of 1,099,511,627,776 possible unique values for link identifier 14. Link identifier 14 is generated by the information services provider in a manner to ensure that there are no duplicate link identifiers 14 issued for the same entity of a given type.

Figure 1A:
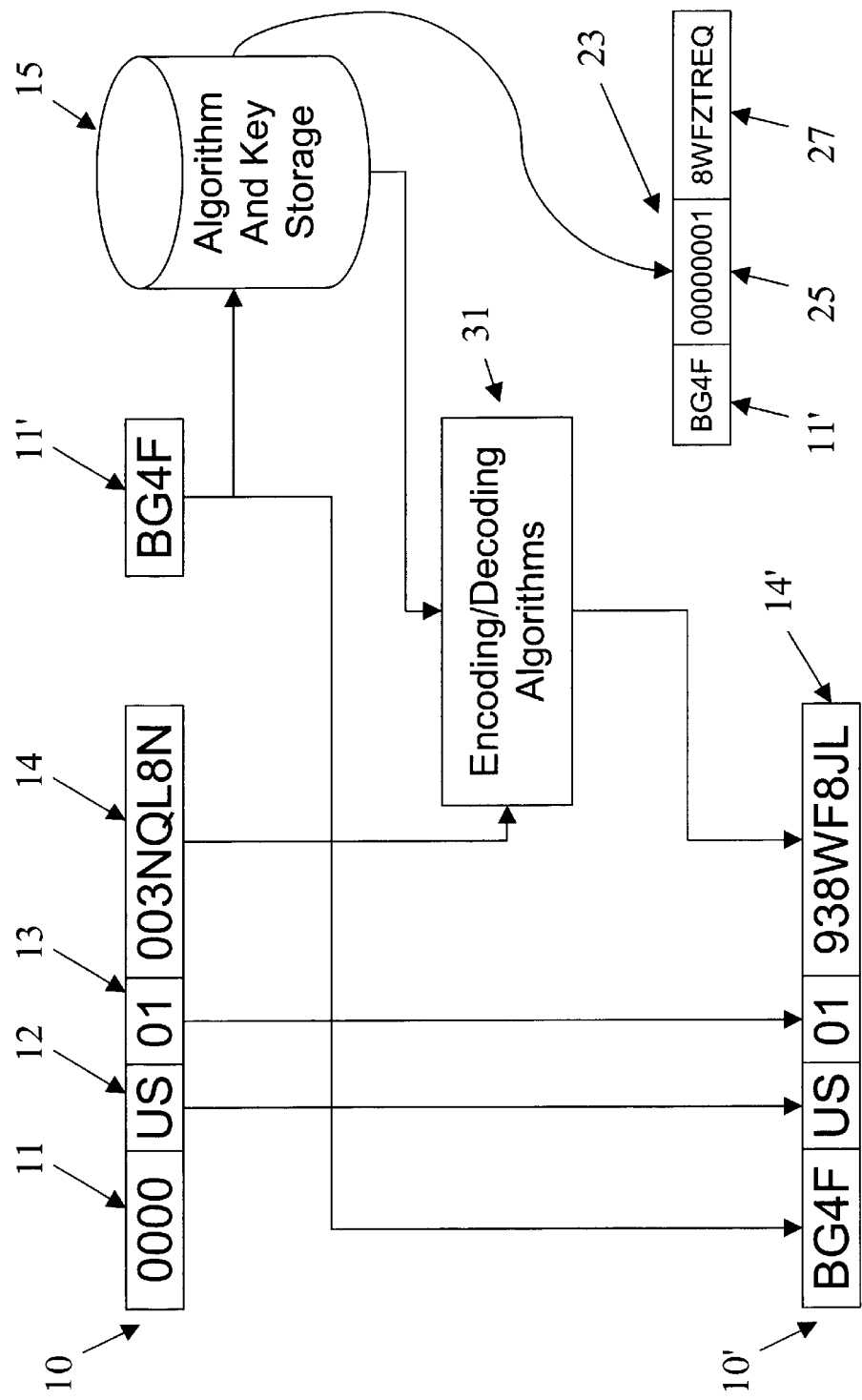
FIG. 1a is a diagram showing the link encoding process.

Referring now to FIG. 1a, a method of encoding the links according to a preferred embodiment of the invention may be described. A link 10 that is maintained internally by the information services provider will preferably have, as explained above, a domain 11 value of "0000. " This null value indicates that link 10 is maintained internally and thus is not encoded. Suppose that link 10 is used for data associated with the United States, which has a country code 12 of "US," and further suppose that this is a maintained consumer link, which has a type code 13 of "01. " Given a link identifier 14 for this particular consumer's information of "003NQL8N," link 10 in this example thus has a value of "0000US01003NQL8N."

Figure 1B:
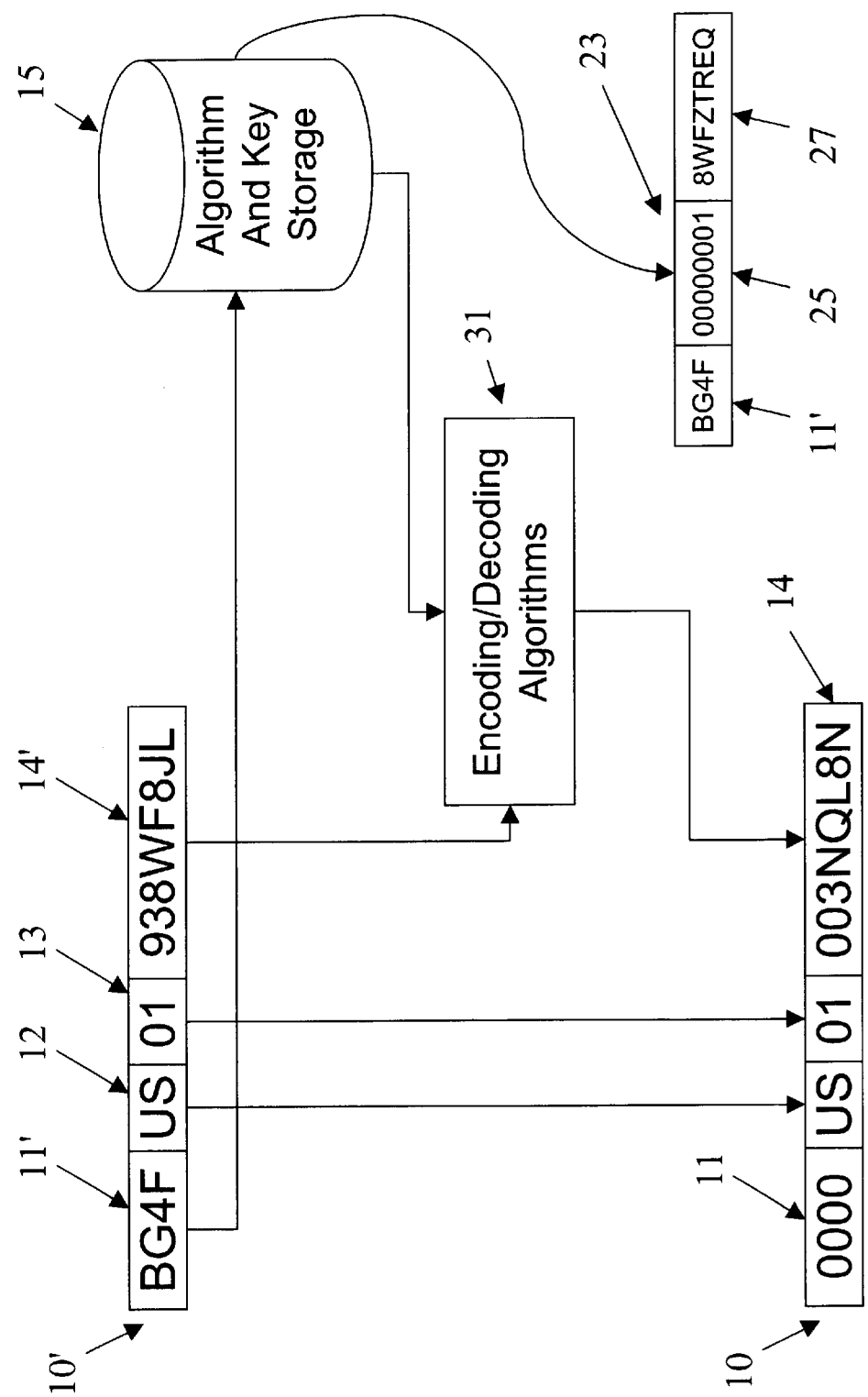
FIG. 1b is a diagram showing the link decoding process.

Now further suppose that this link 10 is to be distributed to a client as part of a database integration, enhancement, or other service. The client to whom link 10 is to be distributed has been assigned a client-specific domain 11' value of "BG4F." Algorithm and key storage module 15 contains algorithm/key look-up table 23. Each client to whom a domain value has been assigned is also assigned a particular (but not necessarily unique) encoding algorithm, identified by an algorithm identifier 25, and an encoding key 27. Algorithm/key look-up table 23 contains a listing of each algorithm identifier 25 and key 27, indexed according to the corresponding domain value 27. In a preferred embodiment, algorithm identifier 25 is stored as simply an eight-bit binary number, and key 27 is stored as a 512-character alphanumeric string of base-32 digits. (For clarity, keys 27 are shown in FIGS. 1a and 1b as only 8-character alphanumeric strings.) In the illustrated example, domain 11' value "BG4F" corresponds to an algorithm identifier 25 value of "00000001" and a key 27 value of "8WFZTREQ" in algorithm/key look-up table 23.

In order to encode link 10, domain value 11' is fed into algorithm and key storage module 15 and the corresponding algorithm identifier 23 and key 27 are retrieved. Encoding algorithm module 31 receives link identifier 14, algorithm identifier 25, and key 27 as inputs. Encoding/decoding algorithm module 31 uses algorithm identifier 25 to determine which of its repertoire of encoding algorithms to apply, and performs the encoding algorithm on link 14 using key 27. The resulting output of encoding algorithm module 31 is encoded link identifier 14'. In the preferred embodiment, encoded link identifier 14' is of the same basic structure as link 14. The encoding process then concatenates the domain 11' value, country code 12, type code 13, and encoded link identifier 14' to form encoded link 10'.

Now suppose that an encoded link 10' is received by the information services provider from a client. This may be, for example, as a result of a data enhancement or update request, after the client has already had links 10' applied to its data. In order to perform this processing, the information services provider must decode encoded link 10' to create decoded link 10 for its internal processing. As illustrated in FIG. 1b, domain value 11' is stripped from encoded link 10' and is fed into algorithm and key storage module 15 in order to retrieve the corresponding algorithm identifier 25 and key 27. Algorithm/key look-up table 23 is used for this purpose in the same manner as described above. Encoding/decoding algorithm module 31 then receives encoded link identifier 14', algorithm identifier 25, and key 27 as inputs. Encoding/ decoding algorithm module 31 uses algorithm identifier 25 to determine which of its repertoire of decoding algorithms to apply, and performs the decoding algorithm on link 14' using key 27. The resulting output of encoding/decoding algorithm module 31 is decoded link identifier 14. As illustrated in FIG. 1b, the decoding process then concatenates the domain 11 null value of "0000", country code 12, type code 13, and decoded link identifier 14 to form decoded link 10. Internal processing may then continue as further described herein.

The particular encoding/decoding algorithms used by encoding/decoding algorithm module 31 are not critical to the invention, provided that it is sufficiently difficult for a customer to create a decoded link 10 from an encoded link 10' without knowledge of the algorithm or corresponding key 27 such that it would be commercially impractical for a customer to do so. The size of key 27 in any particular embodiment of the invention will depend upon the class of algorithms chosen and the level of complexity deemed necessary to make decoding of keys by customers commercially impractical. A great number of such algorithms are known in the art.

FIG. 2 illustrates the relationship between consumer, address, and occupancy links using a specific example. Table 16 shows data relative to a husband and wife, the first two rows showing their name and address data while they lived in Denver, and the last two rows showing their name and address data after they move to Miami. (In this example and others that follow, only an abbreviated portion of the link identifier 14 of each link 10 is shown for clarity). As consumer link column 17 demonstrates, the consumer links do not change for each of these persons as they move. These persons are associated with new address links, however, as shown in address link column 18. Occupancy link column 19 demonstrates that the occupancy link association also changes, as these links are used to link information about each of these persons and their address at a particular period of time.

Figure 3:
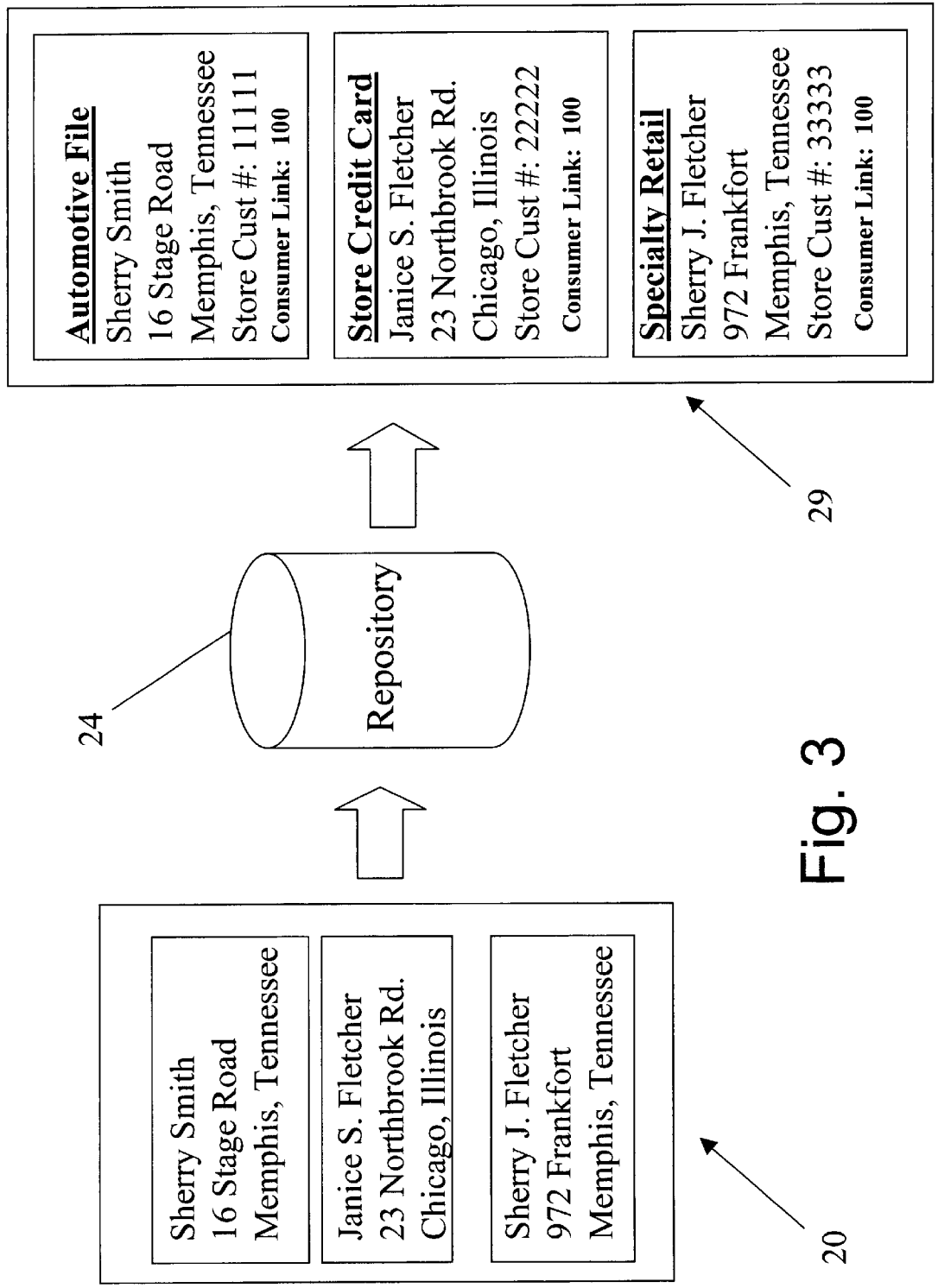
FIG. 3 is a diagram illustrating the results of applying the links to a retailer's customer database according to a preferred embodiment of the present invention.

Before a data owner may link its data using links 10, links 10 must be associated with the data on the database or databases of interest. This initial association is performed by an information services provider. In addition to associating each link 10 with the appropriate data, this process may be used to eliminate duplicates in the relevant database files. Referring now to FIG. 3, an overview of this process is illustrated. Input file 20 is generated which contains each record from the relevant database files maintained by the data owner. Input file 20 may be drawn from a single database, or from multiple independently maintained databases. Input file 20 in the illustrated example includes information about the same customer that is drawn from three separately maintained databases. In this example, simple matching based on name and address would be unable to resolve that this is the same customer, since the customer has moved and changed her name during the period when these separate databases were keeping records. By using repository 24, however, the information services provider is able to determine that each of these records contains data pertaining to a single customer. Thus each record in result file 29 contains the same link 10 for this consumer, and the data owner will now be able to access all of its data concerning this consumer simply by searching for all data linked by this particular link 10.

Figure 4:
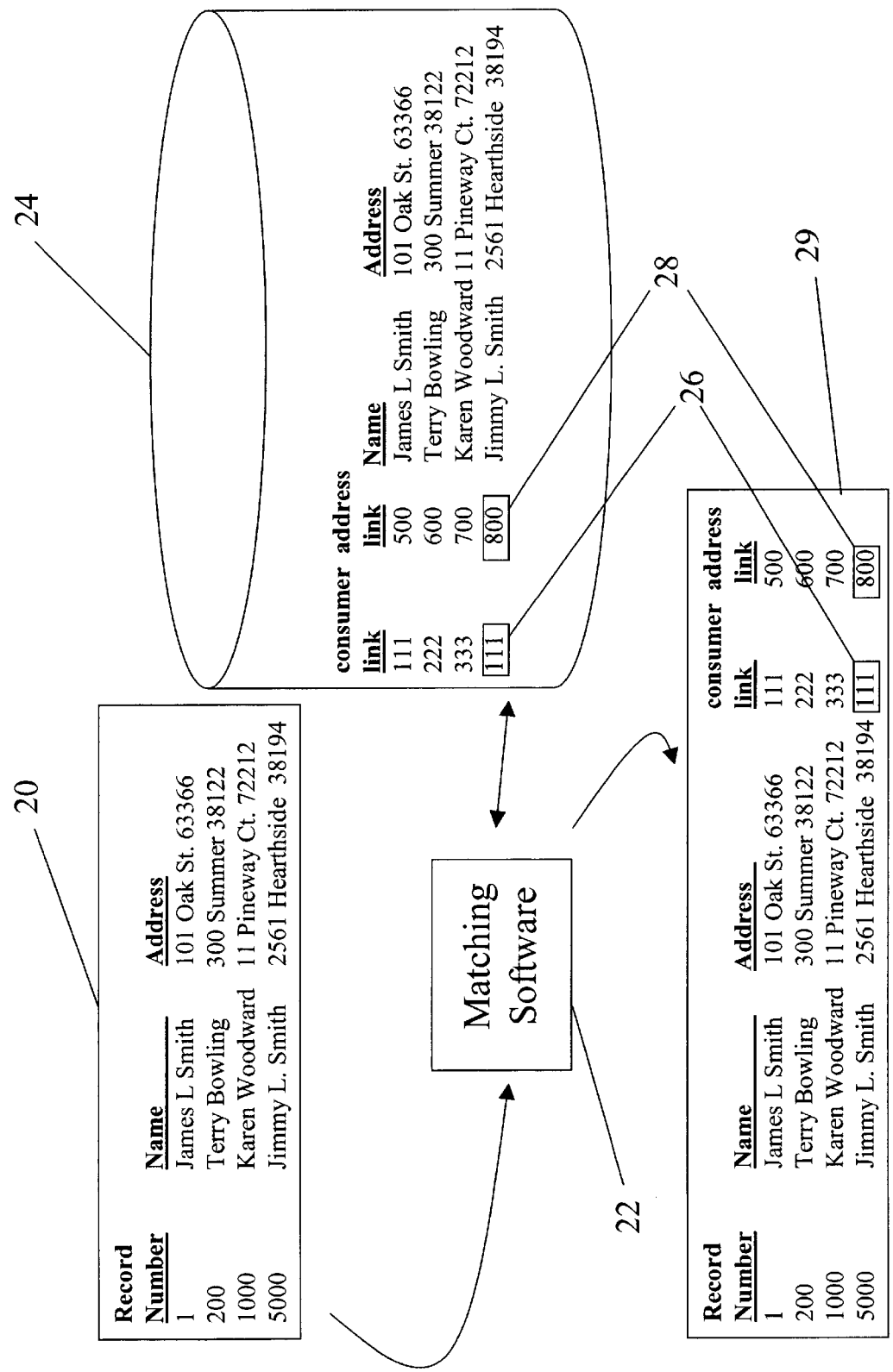
FIG. 4 is a diagram illustrating the procedure for applying links to a customer database according to a preferred embodiment of the present invention.

Referring now to FIG. 4, a more detailed description of the link assignment process is illustrated. The first step in the link association process is to form input file 20. Input file 20 is then fed into matching software 22, which may be executed on computer equipment maintained by the information services provider, but may also be executed on the data owner's own equipment. Matching software 22 then compares data from input file 20 with data from repository 24 to find matches.

Repository 24, which is maintained by the information services provider, contains broad-based information concerning consumers and addresses on a nationwide scale. Repository may be a single physical database, or may consist of a number of physically independent databases linked by a communications network. Preferably, repository 24 will contain information pertaining to virtually all consumers living in the United States or other area of interest.

Figure 5:
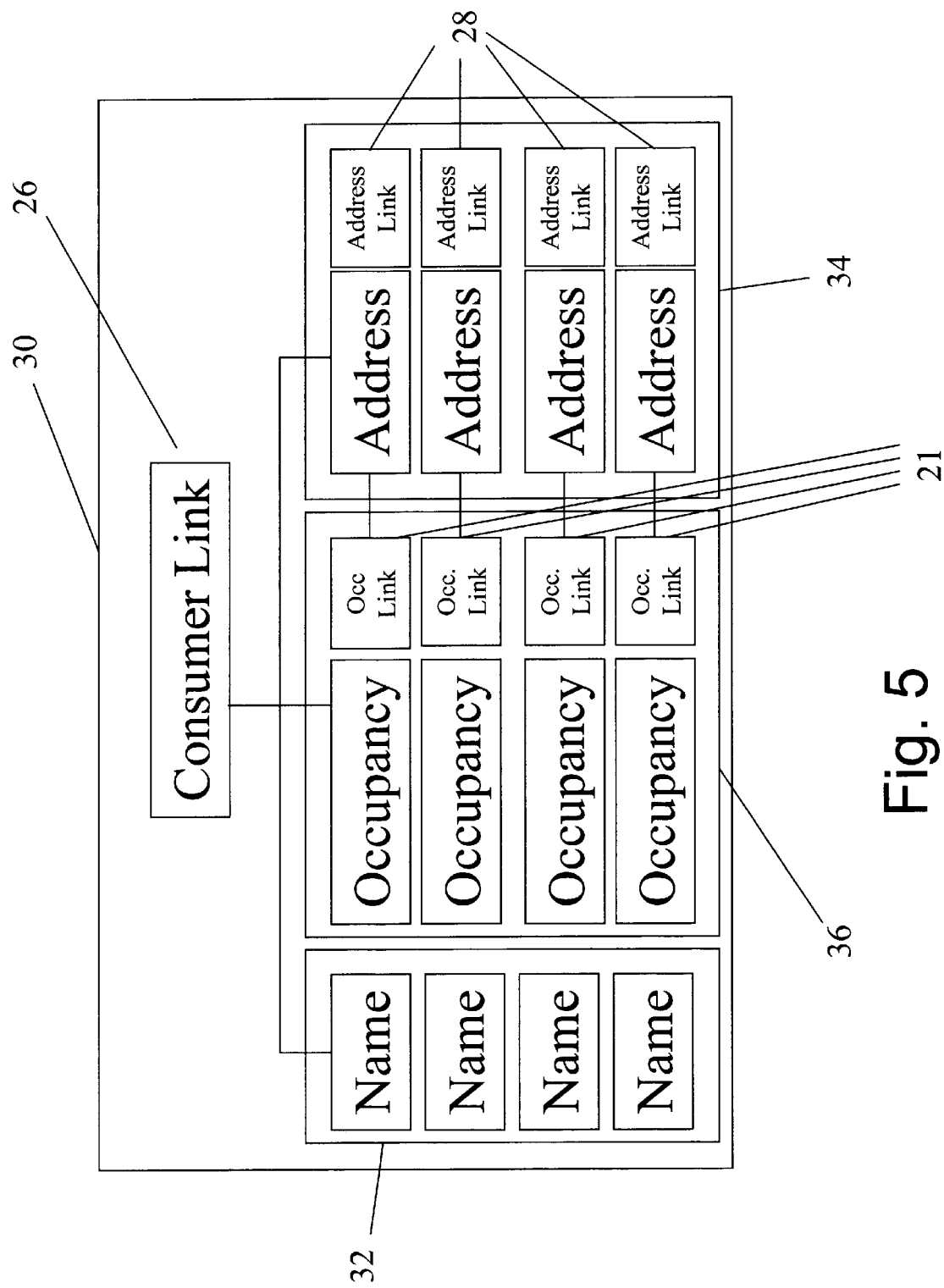
FIG. 5 is a diagram showing the structure of the identification class object resident on the information service provider data repository according to a preferred embodiment of the present invention.

Referring now to FIG. 5, information is stored in repository 24 in the form of identification class 30. Each identification class 30 contains all information available concerning a particular individual, which is linked using consumer link 26. In particular, identification class 30 may contain name history 32, which is a list of the current and former names used by the individual; address history 34, which is a list of addresses at which the individual has resided; and occupancy history 36, which includes the occupancy links 21 associated with each name/address correlation for a particular period of time. Address history 34 may be used to build occupancy history 36, since, as noted above, an occupancy is the combination of an individual's name at a particular time and the address at which that individual resided at that time. Address history 34 may also include an address link 28 for each address in address history 34. Name history 32 and address history 34 allow matching software 22 to perform correct matching of data with links 10 even when an individual has changed both his or her name and address. Identification class 30 may also contain various sorts of demographic information concerning the particular individual to which it pertains. This additional information may also be used by matching software 22 for comparison. Identification class 30 may also contain common name and address misspellings as part of or separate from name history 32 and address history 34.

Referring again to FIG. 4, the process of attaching links to the corresponding data in input file 20 after matching software 22 has completed the matching process is described. As explained above, each identification class 30 includes a consumer link 26 and at least one address link 28. (Where identification class 30 contains past addresses in address history 34, additional address links 28 may be linked to those past addresses.) As a result of the execution of matching software 22, input file 20 is rewritten to include the correct consumer link 26 and address link 28 as part of each record. Result file 29, which consists of input file 20 augmented with consumer links 26 and address links 28, is then returned to the data owner. Duplicate elimination is automatically performed in this process, since the result file 29 will have identical consumer links 26 for each record that contains information referring to the same individual. For example, result file 29 contains records for "James L. Smith" and "Jimmy L. Smith," but since each record is matched to the same consumer link 26, the data owner may now easily determine that both records refer to the same customer.

Input file 20 and result file 29 may be transmitted in any manner suitable for the transmission of electronic files. Preferably, the files may be transmitted between the data owner and information service provider using FTP (file transfer protocol) techniques through a telecommunications network, or may be physically transferred on electronic storage media such as magnetic tape or disks. Since the matching software 22 relies upon the comprehensive data in repository 24 for matching, rather than on similarities contained within the input file 20 itself, there is no limit on the minimum size of input file 20. Input file 20 may be as small as a single record with no loss in the accuracy of the matching process.

Figure 6:
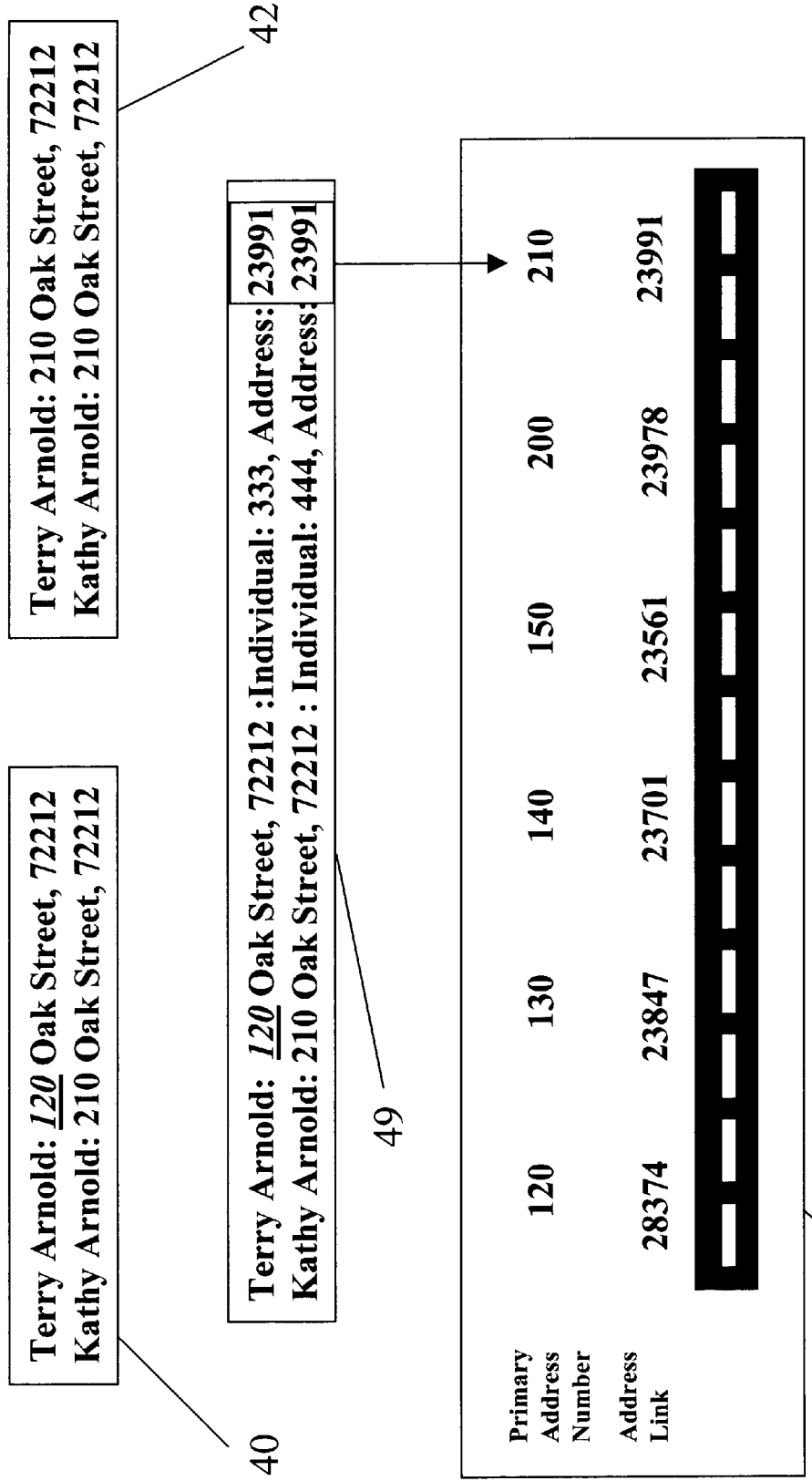
FIG. 6 is a diagram illustrating the procedure for linking customer data despite an error in the address information according to a preferred embodiment of the present invention.

Referring now to FIG. 6, a specific example using the present invention to resolve an address error is described. Erroneous input data 40 contains name and address information for a husband and wife. Erroneous input data 40 contains a typographical error pertaining to the husband; the street address of "210" has been transposed to "120." As shown in delivery map 46, street address "120" does in fact exist. Because the address is valid but is incorrect for this particular consumer, this error would ordinarily be difficult to resolve; for example, simply matching this data against a master address list would not reveal an error. In addition, even though repository data 42 contains the correct data, it would be difficult to match the data without links since the "120" street address would not be a part of the husband's address history stored in identification class 30.

Using links according to the present invention, however, the problem of matching data with typographical errors may be resolved using matching software 22 because, since matching software 22 performs its function based on occupancy matching rather than either names or addresses alone, the typographical error is ignored in the matching process. This enables the return of resulting data 49 with the correct links despite the typographical error. In a similar manner, matching software 22 can draw on the comprehensive data in repository 24 to resolve other address problems, such as address aliases, multiple correct street names, and common misspellings. Alternatively, resulting data 49 may be delivered containing the corrected address information as found in repository 24, based on link linking. In addition, resulting data 49 may be delivered with additional address information missing from input data 40, such as, for example, an apartment number that was not included with erroneous input data 40.

By using address links stored in identification classes 30, the present invention may be used to perform householding. A desired objective of many data processing systems is to determine how many customers share the same household. Definitions of a household may vary from business to business. One business may define a household as natural families residing at a single address. Another may consider two unrelated roommates to be a single household. Still another business may treat legally separated couples who reside at separate addresses as a single household in some instances, and as separate households in others.

The use of identification class 30 to assign a common address link 28 to different customers as illustrated in FIGS. 5 and 6, despite street name aliases and other problems, significantly increases the accuracy of householding data. Using the most common definition of household, that is, persons who live at the same address, householding may be performed simply by accessing all data with a common address link 28. The concept of householding can be extended to other definitions by linking identification classes 30 on repository 24 based on other objective data contained in identification classes 30 which is pertinent to separated families, roommates/relative distinctions, name changes which result in common surnames, and similar issues. Links 10 with different type codes 13 may be used to link data according to each household definition. For example, a type code 13 of "03" may be used for links 10 that are used to link all data according to the traditional definition of household, and a type code 13 of "0A" may be used to link all data according to the roommate/relative definition of household. Such links 10 may be returned as an additional appended link for each record in resulting data 29, as shown in FIG. 4.

Figure 7:
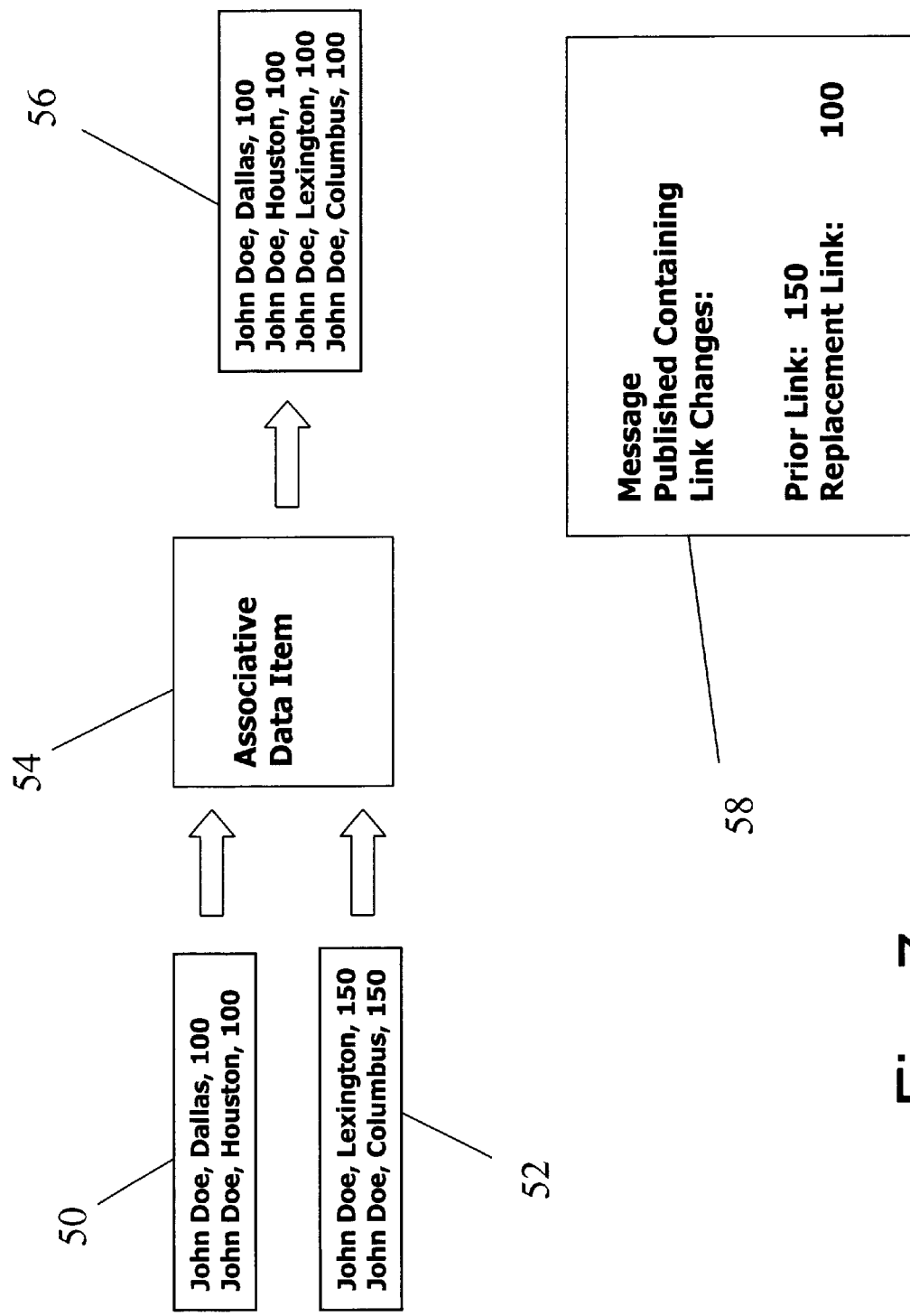
FIG. 7 is a diagram illustrating the procedure for performing link maintenance by consolidating links according to a preferred embodiment of the present invention.
Figure 8:
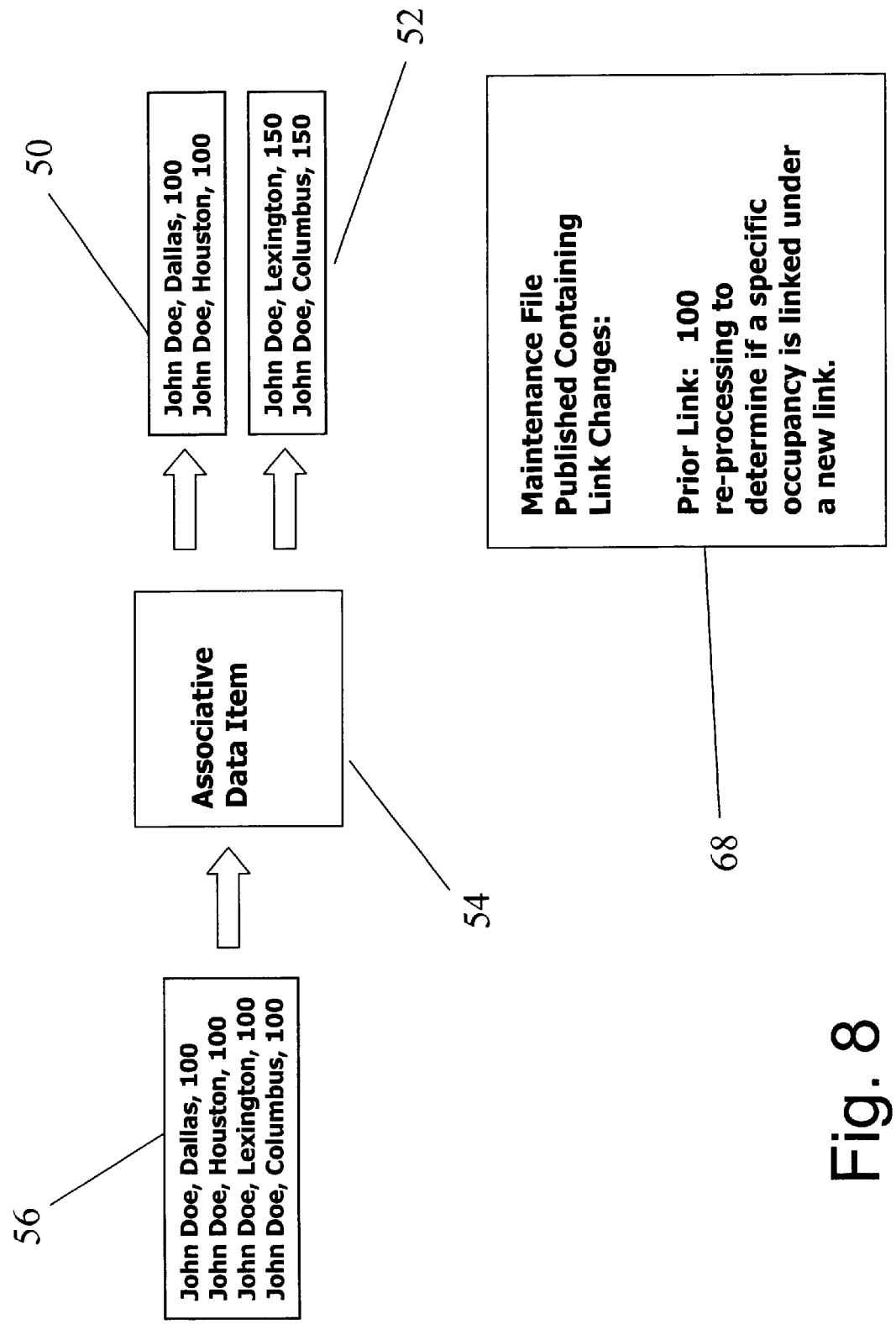
FIG. 8 is a diagram illustrating the procedure for performing link maintenance by splitting links according to a preferred embodiment of the present invention.

Referring now to FIGS. 7 and 8, the methods for performing link maintenance according to a preferred embodiment of the present invention are described. While repository 24 contains comprehensive information on the entire population of interest (for example, consumers in the United States), it cannot possibly contain all desired information with respect to all such persons, since such information is constantly in flux. As repository 24 is presented with new consumers and addresses, it must assign a new link 10 to link information relevant to those entities. It may occur, however, that as more information is later gathered about that entity, that the entity is in fact an old entity that was already known but, based on the available information in repository 24 at the time, could not be resolved into a single entity. The solution to this problem is to consolidate the two links into a single link. Likewise, a similar problem occurs when two entities are incorrectly resolved into a single entity, and it is later determined that repository 24 should maintain these as two separate entities using two separate identification classes 30. The solution to this problem is to assign a new link so that a separate link may be used to link data to each of the two entities.

The process of link consolidation and splitting does not require the data owners who have already been supplied with links to rebuild their databases. Instead, these data owners are merely provided with an electronic file containing a table of link updates. For example, as illustrated in FIG. 7, repository 24 maintains an identification class 30 for a first consumer 50 and a second consumer 52. These two consumers have different link identifiers 14 of "100" and "150" assigned to link data relevant to them. Suppose then that a new associative data item 54 is entered into repository 24, which indicates that first consumer 50 and second consumer 52 are in fact the same consumer. The result is to merge the identification classes 30 for these two consumers into a single identification class 30 that contains all information relevant to consumer 56. A single link identifier 14 of "100" is now used to link all of this information. The other link identifier 14 of "150" is now permanently retired from the set of all links.

To update data owners concerning this change, the information service provider sends consolidation message 58. Consolidation message 58 informs the data owner that the retired link identifier 14 of "150" must now be replaced wherever it occurs with link identifier 14 of "100" that had been used with respect to this consumer. The data owner now need simply run a software routine that searches for all occurrences of the retired link 10 and replace it with the new link 10. The information service provider can send consolidation messages 58 as soon as associative data item 54 is received, or it may send periodic consolidation messages 58 that reflect all link consolidations that have occurred since the last consolidation message 58 was sent.

Turning now to FIG. 8, the process for performing link splits is also illustrated by example. Repository 24 initially contains information that consumer 56 is a single individual, for which all relevant information is contained in an identification class 30, including the single consumer link 26 used to link data relevant to this consumer. Associative data item 54 is then received by repository 24, but in this case associative data item 54 indicates that consumer 56 is in fact two different consumers. A software routine is then performed to split the identification class 30 for consumer 56 into two identification classes, one for first consumer 50 and the other for second consumer 52. While existing consumer link 26 may be used to link data relevant to one of these entities, a new consumer link 26 must be assigned to link data relevant to the other consumer.

To notify data owners concerning a link split, split message 68 is published in a manner similar to that described above for consolidation message 58. Split message 68 and consolidation message 58 may be merged to form a single message that is periodically sent out to data owners. Additional information is required in the case of a split, however, since the data owner must know which data retains the old consumer link, and which data will be tagged with the new consumer link. Reprocessing will be necessary to determine if a specific occupancy is to be tagged with the new link.

Referring now to FIG. 9, the advantages of performing data updates using a preferred embodiment of the invention are described. The first step to apply the present invention to a data owner's data processing system is to overlay the links 10 onto the data owner's data, as explained above. In the example of FIG. 9, customer data 70 contains records from four physically independent databases, totaling 23 million records. Customer data 70 is input into consolidation process 72 and link assignment 74 (these processes are performed by matching software 22, as discussed above, based on data from repository 24). Alternatively, consolidation process 72 may be skipped and data may be fed from each source in customer data 70 directly to link assignment 74. The modified customer data 70, with links 10 added to each record, becomes customer file 76. This initial build is resource-intensive, since all 23 million records of the data owner's data must be processed to initially assign links 10 to customer data 70.

Suppose now that the data owner wishes monthly updates to its data. Instead of reprocessing all of customer data 70, only update data 78 need be processed. Update data 78 represents that new data that the data owner has acquired in the preceding month. This data may be, for example, new customers the data owner has acquired during the preceding month. In the example of FIG. 9, update data 78 contains only 1.5 million records from two different databases. Update data 78 is input to consolidation process 72 and link assignment 74 (or directly into link assignment 74) as described above with respect to the initial build, and then integrated with customer file 76. Since consolidation process 72 and link assignment 74 are based on information in repository 24, and not on name and address comparisons across all of customer data 70, it is not necessary to reprocess the entire file to perform the update procedure.

The present invention contemplates that updates can be performed as often as desired—monthly, daily, or even in real time as new records are received. Since all of the information necessary for matching is contained in repository 24, and thus customer data 70 is not used for cross-comparison, update data 78 could be a file as small as a single record. In the real-time update environment, just as a new record is received, it is sent as update data 78 to the information service provider, which immediately runs matching software 22 to perform consolidation process 72 and link assignment 74, thereby allowing real-time update of customer file 76. More frequent updates will reduce the volume of each update, and thereby relieve computational resource bottlenecks caused by less frequent processing of large updates. In addition, more frequent or even real-time updates will allow the data owner to maintain the most accurate information concerning all of its customers.

Once the linking links are in place in a data owner's databases, one application according to a preferred embodiment of the present invention is data integration. Many businesses today are finding it advantageous to implement "Customer Relationship Management" (CRM) plans. The goal of a CRM plan is for the business to completely understand its relationship with any particular customer. CRM requires that a business integrate all information known about each customer, whether such information is derived from inside or outside sources. This integrated information would ideally be available in real time so that the business may respond immediately to interactions initiated by any given customer. CRM may include, for example, knowing all products and product lines of interest to the customer, knowing the customer's purchasing history with all of the business's various divisions, and knowing the customer's relevant demographic (or, in the case of a business, firmographic) information. Using this type of information, businesses find that they are better able to serve their customers through sales and marketing efforts that are specifically tailored to the interests of a particular customer. Customers find this process desirable as well, since they are alerted to products and offers in which they are interested, but are not solicited to purchase those products or services in which they have not expressed an interest.

The key element of any successful CRM plan is the creation of a "Total Customer View" regarding any particular customer. The total customer view consists of an assimilation of all relevant information for a customer, from any number of disparate information stores, arranged in a manner to facilitate CRM. The principal obstacle facing a business attempting to build a total customer view system is that the business's information stores usually contain overlapping information about the same customer that is not equally consistent, accurate, and current. As a result, information concerning the same individual may reside in multiple databases or information stores with various inconsistencies. Because each of these data stores may use a different customer numbering scheme, or may rely merely on name and address matching, successfully linking this data together using only internal information is difficult, and cannot be performed with a high level of accuracy.

FIG. 10 provides an illustrative example of this problem. Each row of company data table 80 represents a record pulled from a different database maintained by one of a retailer's various divisions. Each column of company data table 80 represents a particular field in these records, such as name, address, and customer account number. The information in this case is pulled from four different databases maintained by the retailer—automotive services, home services, retail sales, and the sporting goods "special mailing list." Although the records from each database actually represent the same individual, the variations in name spelling, the individual's change of address, and the different account numbers used by each division would make it impossible to match this data together using internally-generated matching routines. The retailer would thus be unable to determine that this is a single individual, rather than four different individuals, and would therefore be unable to build an accurate total customer view.

Referring now to FIG. 11, the result of using links to match this information is illustrated with linked data table 90. In linked data table 90, each record on the company's various databases has been augmented with the appropriate links. Repository 24, which contains all of the variant name spellings and address history for customer William F. Smith, will be able to resolve that each of these records contains information referring to the same individual. Once the records are "tagged" with the proper links, the retailer may quickly and easily link all of its data concerning this individual through a simple link matching process. The retailer can also quickly and easily link to information about this customer that is maintained by an external information services provider, thereby allowing update or enhancement of the retailer's data.

Figure 12:
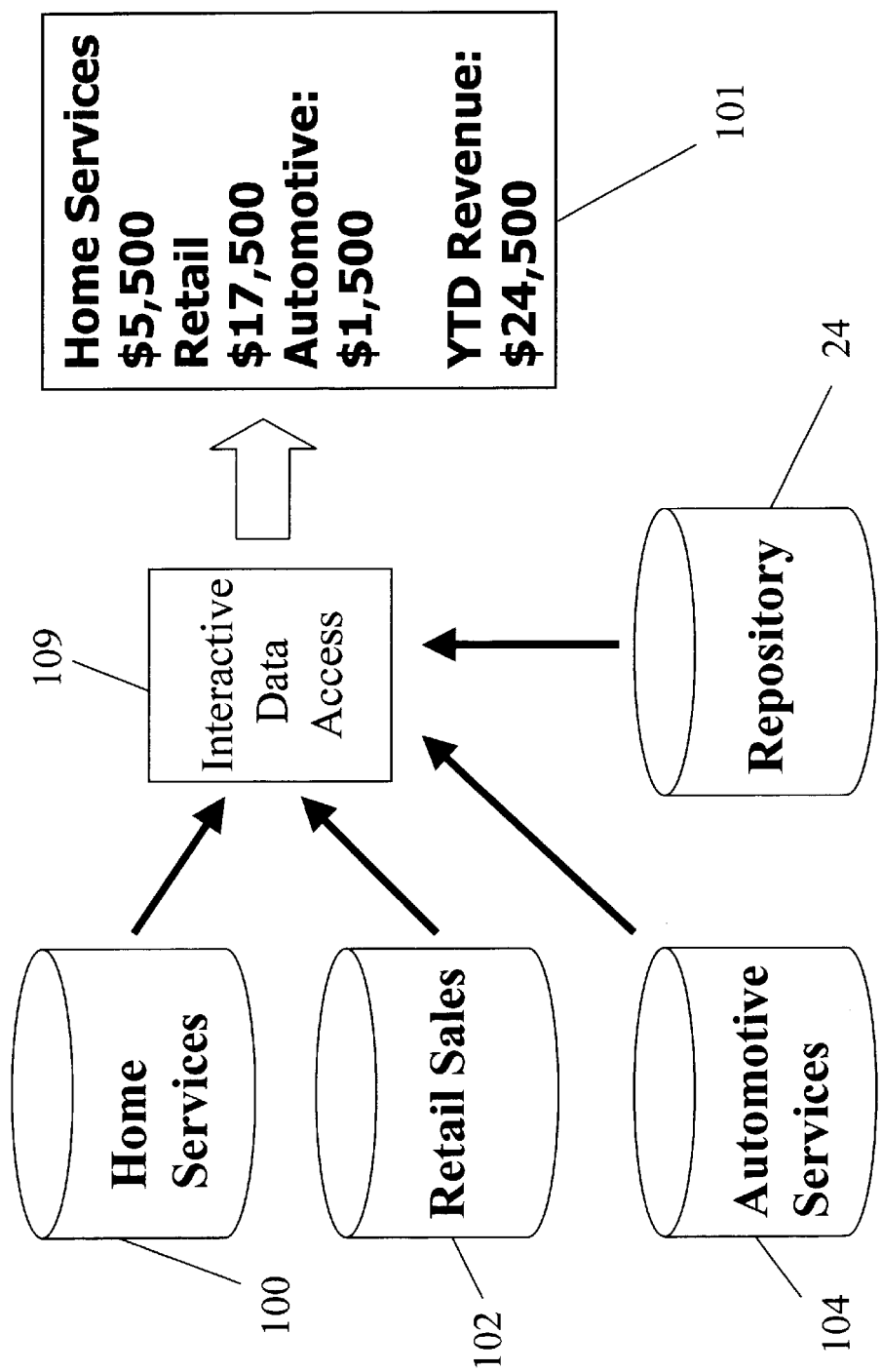
FIG. 12 is a diagram illustrating a method of building a total customer view using links according to a preferred embodiment of the present invention.

Referring now to FIG. 12, the method for constructing a total customer view for customer William F. Smith is illustrated. The information accumulated by each of the retailer's divisions has been tagged with the consumer link 26 for William F. Smith—this information is contained in home services database 100, retail sales database 102, and automotive services database 104. By using interactive data access routine 109, the retailer may search for all data relevant to customer William F. Smith merely by searching for the consumer link 26 used to link that data, and retrieving all records tagged with that link. In addition, the retailer can also connect to repository 24 maintained by the information service provider to pull additional information concerning customer William F. Smith as desired. Because this link-matching process is computationally simple, it may be performed in real time. The result is total customer view 101, through which the retailer may immediately determine its total relationship with this customer. The total customer view 101 may, for example, enable the retailer to direct its marketing efforts toward this particular customer in a more efficient manner by concentrating on products and services that this customer is known to favor.

Figure 13:
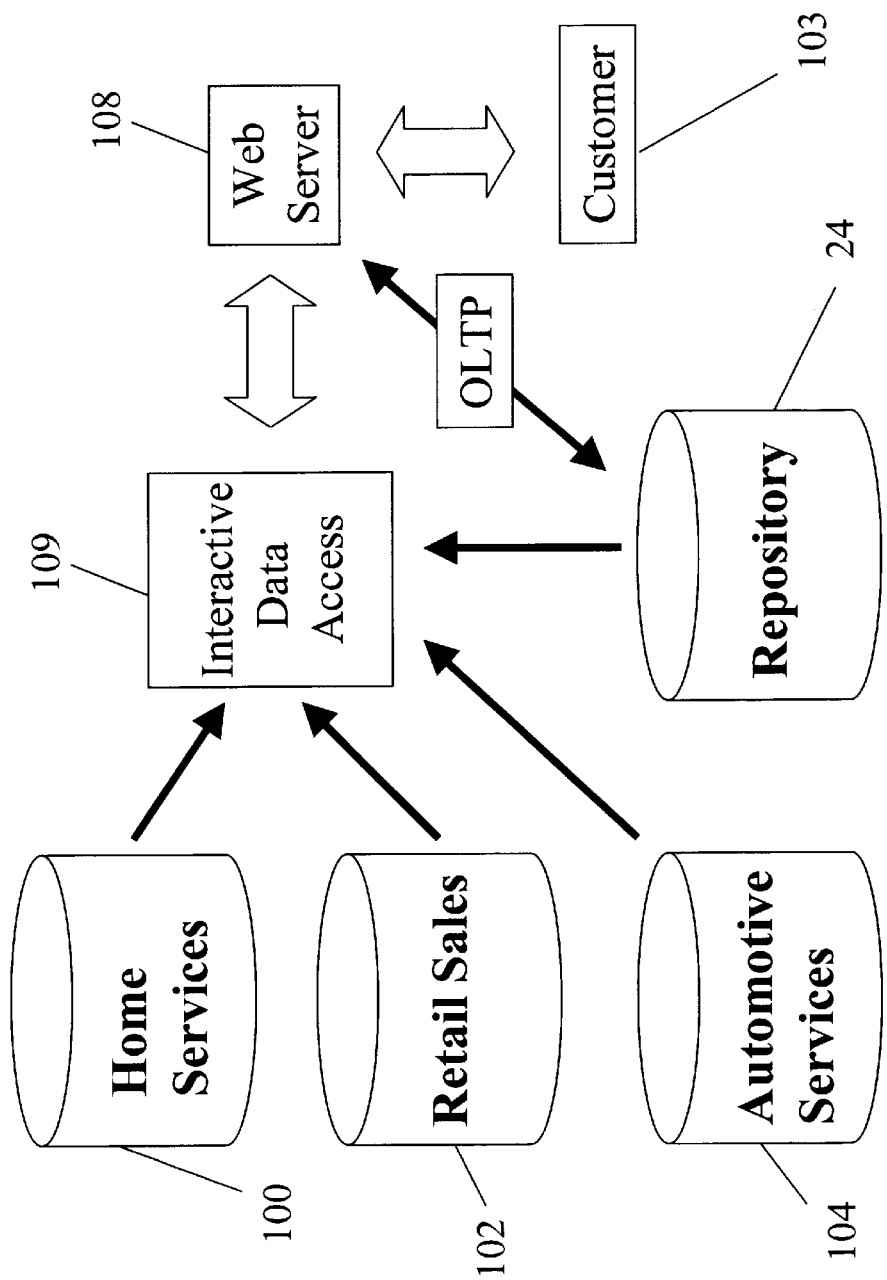
FIG. 13 is a diagram illustrating a method of responding to consumer input to build a customized web page using links according to a preferred embodiment of the present invention.

The process illustrated in FIG. 12 and described above may be applied to several important tasks relevant to customer relationship management. FIG. 13 illustrates the example of a customer 103 contacting a large retailer through the retailer's Internet web site. Suppose that customer 103 decides to order rain gutters for his home. He then accesses the Internet web site the retailer maintains to facilitate e-commerce, which is hosted on web server 108. Upon accessing the web site, the customer is prompted to enter his name and address by the software maintained on web server 108. Web server 108 then determines the consumer link 26 used to link information concerning customer 103. Once a match is found, then interactive data access 109 may search all of the retailer's various databases for matches to this link, including home services database 100, retail sales database 102, and automotive services database 104. This data is then returned to web server 108. Again, since matching is performed using links, this process will return all relevant data concerning customer 103 regardless of whether there is a match between a particular record containing relevant information and the name and address entered by the customer in response to the query of web server 108. In addition, the link may be used to retrieve additional information from an information services provider's repository 24 in real time through a connection with repository 24. Linkage with the repository 24 may preferably be by OLTP techniques. The combined data of the retailer and information services provider may then be used by web server 108 to immediately build a customized Internet web page for viewing by customer 103. This customized web page may, for example, display special promotions particularly of interest to that customer. This entire process may, in a preferred embodiment of the invention, be performed in real time and will thus not result in noticeable delay for customer 103.

In an alternative embodiment of the present invention, a data owner may provide a customized web page for viewing by customer 103 by sending customer 103's response to the query by web server 108 directly to an information service provider's repository 24. The information service provider then uses this information, in conjunction with the data in repository 24, to find the appropriate consumer link 26 to match all relevant information about customer 103. If additional information from the information service provider is requested, that data can be returned along with the appropriate consumer link 26 to web server 108. This consumer link 26 may then be used to match all information the retailer maintains about customer 103 using interactive data access 109 as explained above. This aggregate of data may then be used by web server 108 to construct a customized web site for customer 103. This aggregate of data may also, in an alternative embodiment, be transmitted to an analytical modeling engine (not shown) to perform data mining and other analytical functions, the results of which may be returned to web server 108 to assist in constructing a customized web site for customer 103.

The present invention may allow a retailer to use a customer transaction or input as an opportunity to update its data concerning that customer. Again referring to FIG. 13, suppose that customer 103 has recently moved from Jacksonville to Phoenix. Customer 103 then decides that his new home needs rain gutters, and he attempts to order them over the Internet through the retailer's e-commerce web site. Suppose once again that web server 108 prompts customer 103 for name and address information. None of the retailer's internal databases will contain customer 103's new address, and thus it may be difficult to accurately connect all information about customer 103 without links. If the name and address is sent to the information services provider, however, it may use repository 24 to return to web server 108 the correct consumer link 26 and address link 28 for customer 103, provided that the repository 24 has previously received data indicating the move. The retailer can then use link matching to retrieve all of its data that is relevant to this customer using data access routine 109, and can then use web server 108 to build a customized web page for customer 103 based on this information. The updated address information provided by customer 103 can be used by the retailer to later mail coupons and special offers directed to customer 103 at his correct address.

Figure 14:
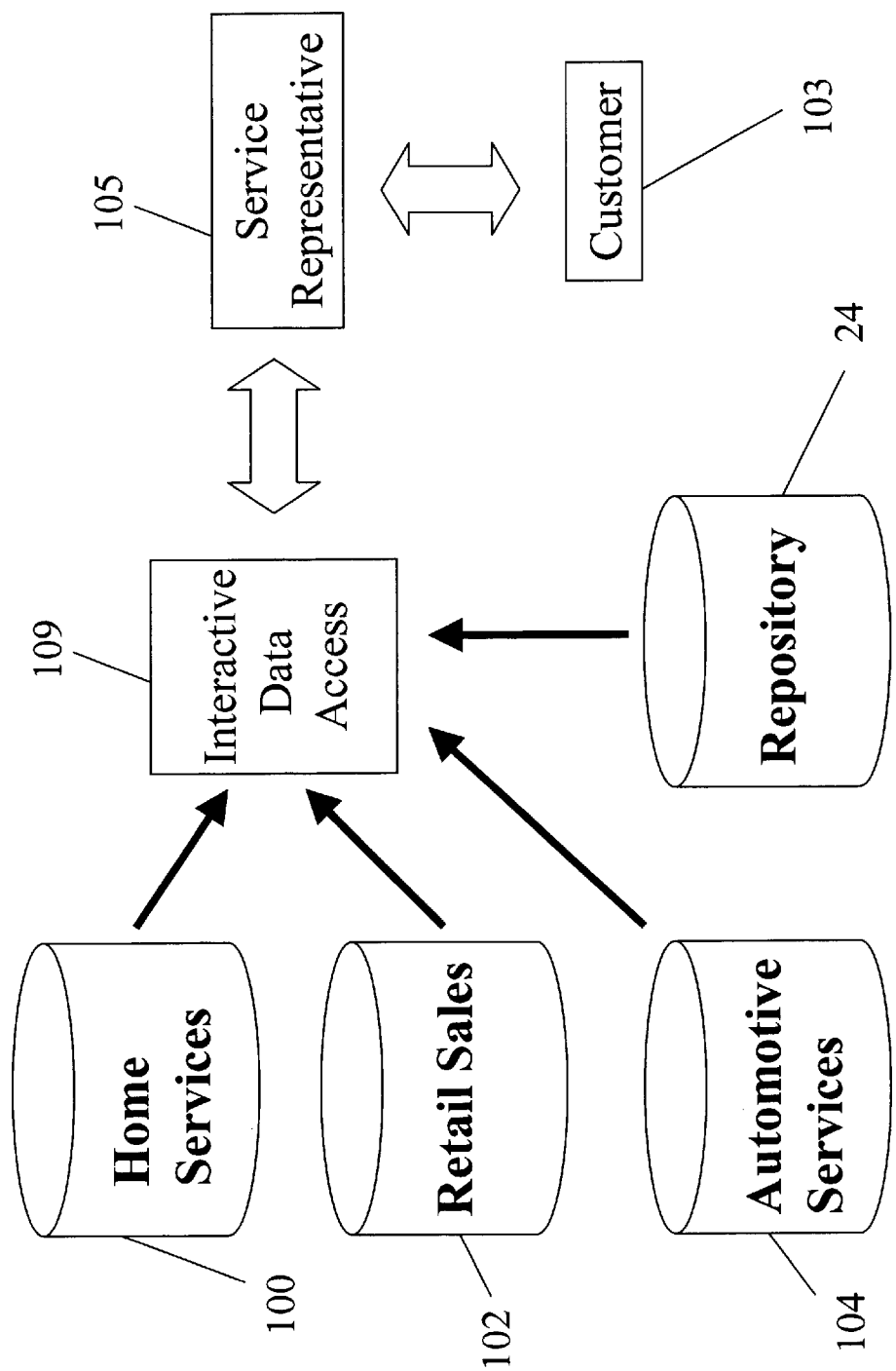
FIG. 14 is a diagram illustrating a method of improving call center response using links according to a preferred embodiment of the present invention.

Still another example will illustrate how links 10 facilitate another important aspect of customer relationship management. Referring now to FIG. 14, suppose that customer 103 calls service representative 105 to complain that the rain gutters he ordered were not delivered on time. Service representative 105 may then immediately call up all available information concerning customer 103 using interactive data access routine 109. As a result, service representative 105 will be able to determine that customer 103 has done substantial business with the retailer in the recent past, and usually purchases sporting goods. By recognizing these facts while still speaking to customer 103, service representative 105 may determine that the best course of action is to offer customer 103 a coupon for a significant discount on his next sporting goods purchase. By having access to all available information concerning customer 103, the retailer is thus able to determine the best method of retaining customer 103 in spite of a poor service event in one particular transaction.

Figure 15:
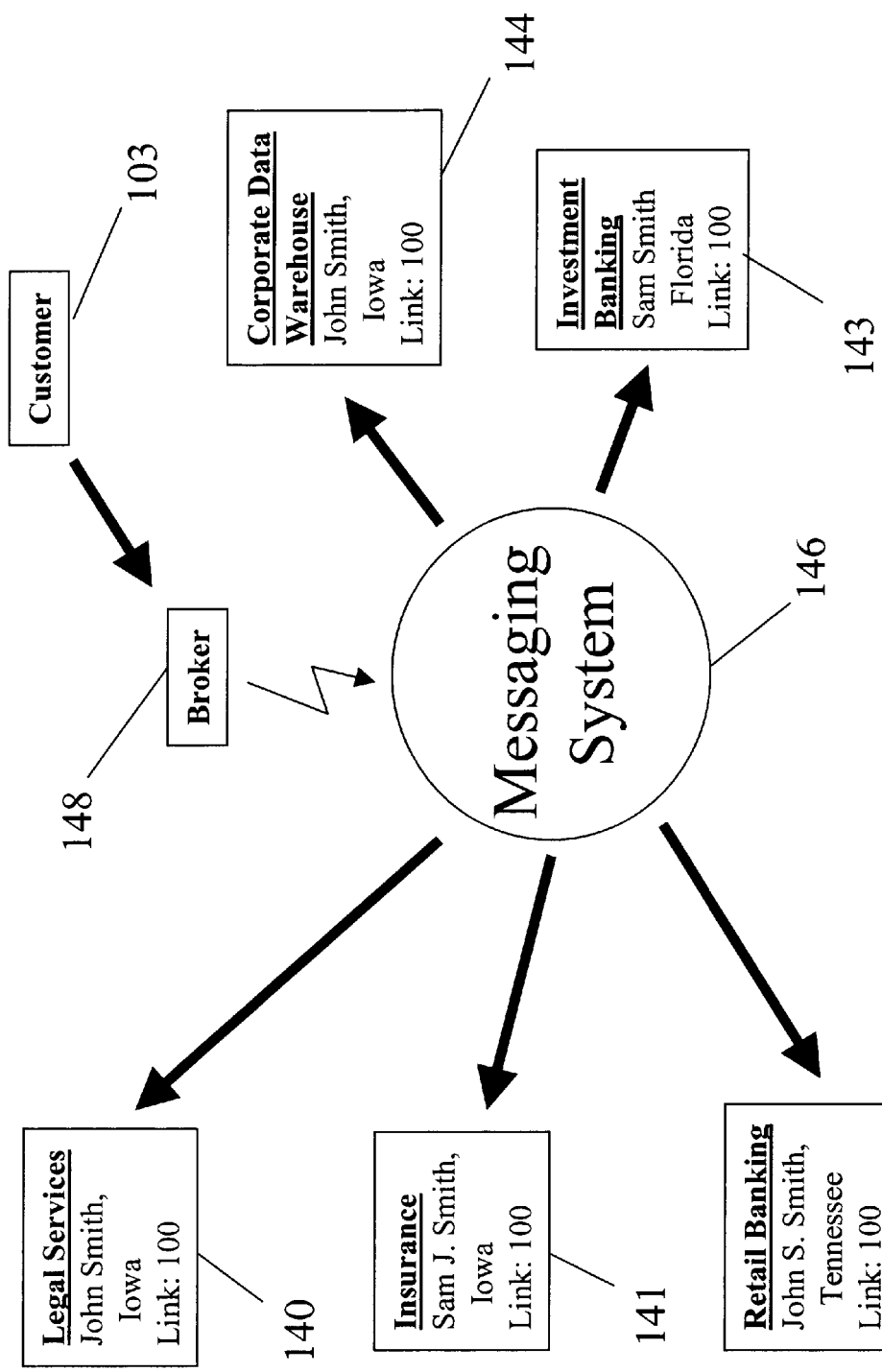
FIG. 15 is a diagram illustrating "trigger notification" customer relationship management using links according to a preferred embodiment of the present invention.

The present invention also may be used to perform trigger notification throughout the various databases maintained by a data owner. For example, this process is illustrated in FIG. 15 for a large financial institution. The financial institution maintains physically separate databases for its various operations, including legal services database 140, insurance database 141, retail banking database 142, investment banking database 143, and corporate data warehouse 144. Broker 148 learns from customer 103 that he is planning to purchase a new home. This information may be valuable to other divisions of the financial institution, such as retail banking and legal, who may wish to offer their services to customer 103 in connection with this transaction. Broker 148 may enter this information into messaging system 146, which then uses matching links to immediately provide this information to legal services database 140, insurance database 141, retail banking database 142, investment banking database 143, and corporate data warehouse 144. Persons operating in the legal and retail banking divisions will now have access to this information, and may retrieve any additional information maintained about customer 103 through data integration using links as illustrated above.

Figure 16:
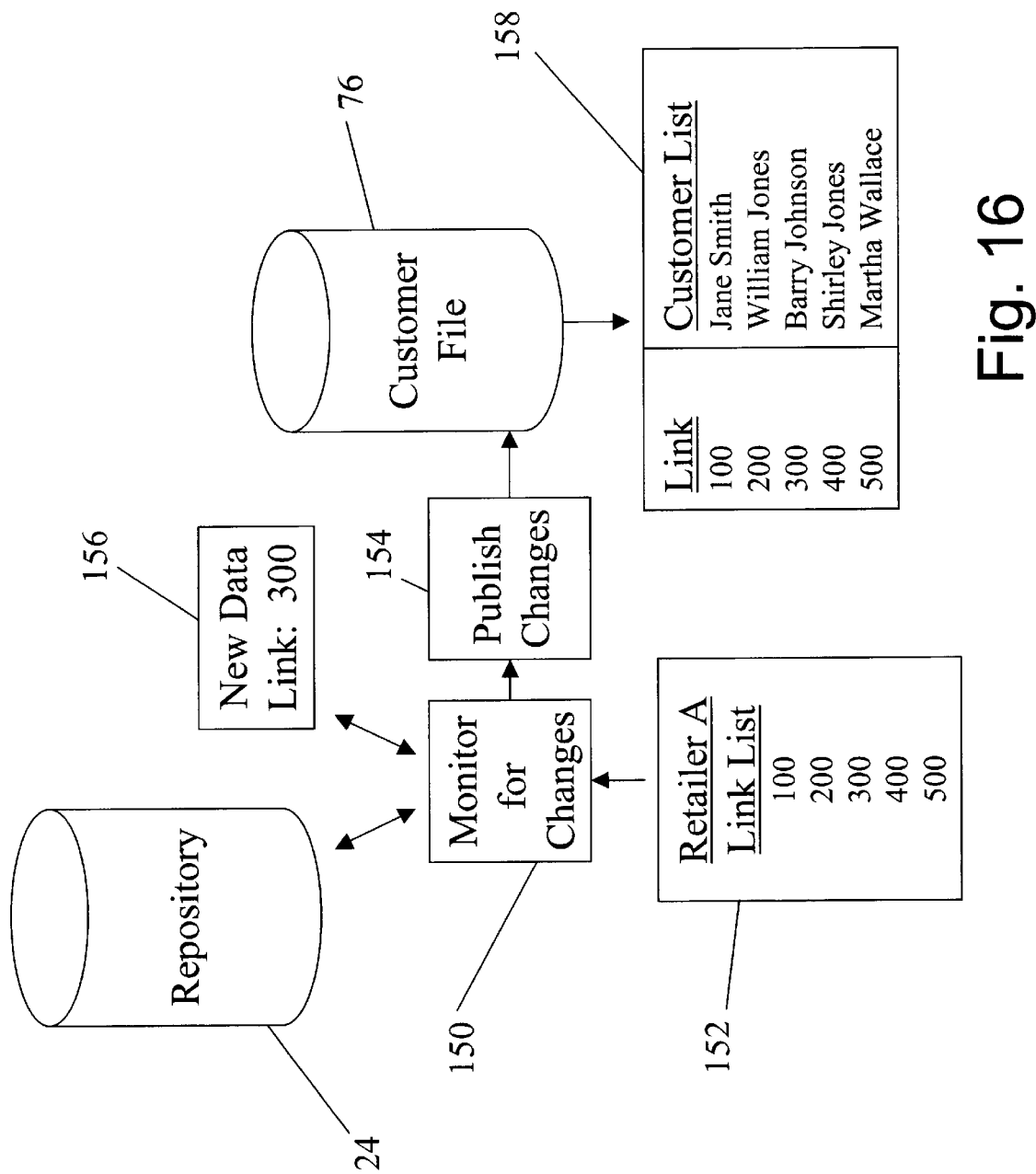
FIG. 16 is a diagram illustrating the use of "push" technology using links according to a preferred embodiment of the present invention.

Still another application of the present invention is to update or enhance data on a customer file 76 not in response to input from the entity about which information is maintained, but instead as new information is added to the data service provider's repository 24. The new information may be automatically "pushed" to those data owners who maintain records concerning the entity to which the information pertains and who wish to receive this service. Referring now to FIG. 16, an example of push technology using links is illustrated. Suppose repository 24 is updated with additional information about a particular customer in the form of update data 156. Retailer A also maintains information about the customer to which this data pertains on its customer file 76, which may be, for example, a database maintained at retailer A's home office data center. Since retailer A has previously subscribed to the push service, the information service provider maintains retailer A links list 152, containing a list of all links 10 corresponding to entities for which retailer A desires push updates. The information service provider's monitor routine 150 checks retailer A link list 152 to determine if update data 156 should be pushed to customer file 76. Assuming that other data owners subscribe to the push service, monitor routine 150 would check the link list associated with each of these subscribers as well. This process may be performed quickly because monitor routine 150 need only compare the link in update data 156 with the links in each link list. Once monitor routine 150 finds a match in retailer A link list 152, it will then pass update data 156 to publish routine 154, which will then communicate update data 156 to retailer A's customer file 76. This communication may be by telephone line or any other means of transmitting data electronically. The result in customer file 76 is updated customer list 158. By subscribing to the push service, retailer A may take advantage of the information service provider's vast resources and access to a nationwide database of information, while at the same time paying only for updates to data that is relevant to its business as reflected by that information maintained in customer file 76 and retailer A link list 152.

The present invention has been described with reference to certain preferred and alternative embodiments that are intended to be exemplary only and not limiting to the full scope of the present invention as set forth in the appended claims.

We claim:

1. A data linking system for use by a plurality of clients at a plurality of client sites, comprising:
    (a) a plurality of data elements resident at each client site, wherein each of said data elements pertains to a particular entity;
    (b) a plurality of links resident at each client site, wherein each of said links is unique over time, each of said links uniquely corresponds to a particular entity, each of said data elements is tagged with that one of said links corresponding to the entity to which said data element pertains, and each of said links is encoded distinctively for each client site such that data elements may not be shared between clients; and
    (c) a repository, wherein all of said links are resident on said repository, and said repository contains a substantially comprehensive listing of all said entities from which said links are generated.

2. The system of claim 1, wherein a plurality of identification classes is resident on said repository, and each of said identification classes pertains to a particular entity, contains data concerning the entity to which it pertains, and is tagged with that one of said links corresponding to that entity.

3. The system of claim 2, wherein the data contained in each of said identification classes comprises at least one of name aliases, name change history, address aliases, address change history, alternate name and address spellings, and common name misspellings.

4. The system of claim 1, wherein each of said links comprises a domain field comprising a domain field value, and wherein said domain field value corresponds to a client identity.

5. The system of claim 4, wherein each of said links comprises a link identifier field comprising a link identifier field value, and wherein said link identifier field value corresponds to the particular entity to which said link pertains.

6. The system of claim 5, wherein each of said links comprises a type code field comprising a type code value, and wherein each said type code value corresponds to the data contained in that one of said identification classes corresponding to said link.

7. The system of claim 6, wherein each of said links comprises a country code comprising a value, and wherein each said country code value corresponds to one of a particular country and region.

8. The system of claim 6, wherein said type code field comprises a link level field comprising a link level field value and a link type field comprising a link type field value, wherein each said link level field value corresponds to one of a maintained link, a derived link, and a custom link, and wherein each said link type field value corresponds to one of a consumer link, an address link, an occupancy link, a business link, and a household link.

9. A method of integrating a plurality of data elements resident on a data storage system maintained at one of a plurality of client sites wherein each of the data elements pertains to a particular entity, comprising the steps of:
    (a) building a transfer file comprising the data elements;
    (b) transmitting the transfer file to a repository, wherein at least one identification class is resident on the repository, and each identification class comprises:
        (ii) at least one link, wherein each link uniquely corresponds to a particular entity and each link comprises an unencoded value and an encoded value; and
        (ii) data relevant to the entity to which the link corresponds;
    (c) matching each of the data elements in the transfer file to the corresponding identification class;
    (d) tagging each of the data elements in the transfer file with at least one of the links contained in the identification class matched to that data element;
    (e) encoding each of the links with which the data elements are tagged, wherein said encoded value is dependent upon that one of said plurality of client sites from which said transfer file was built;
    (f) rebuilding the data storage system using the data elements and encoded links in the transfer file; and
    (g) collecting all data elements resident on the data storage system that are tagged with a particular link by searching for the particular link across the data storage system.

10. The method of claim 9, wherein the data contained in each of the identification classes comprises at least one of name aliases, name change history, address aliases, address change history, alternate name spellings, and common name misspellings, and said matching step comprises the matching of the data elements to at least one of name aliases, name change history, addresses aliases, address change history, alternate name spellings, and common name misspellings in the identification class corresponding to each data element.

11. A method of constructing a total customer view using a data processing system, wherein at least one data element is resident on the data processing system, and each data element is tagged to the link corresponding to the customer to which the data element pertains, comprising the steps of:
    (a) receiving a request for the total customer view, wherein the request includes an encoded link corresponding to the customer;
    (b) decoding the link corresponding to the customer utilizing an encoding key that is matched to a particular client;
    (c) matching the link corresponding to the customer with the link tagged to all data elements pertaining to the customer;
    (d) retrieving all data elements to which the link corresponding to the customer is tagged; and
    (e) forming the total customer view based on at least one of the retrieved data elements.

12. The method of claim 11, wherein said data processing system comprises a plurality of physically independent databases and at least two of said data elements pertaining to the same customer are resident on two different physically independent databases.

13. The method of claim 11, further comprising the steps of:
    (a) transmitting the link corresponding to the customer from the data storage system to a repository, wherein a plurality of identification classes are resident on the repository, each of said identification classes is tagged with at least one link, and each of said identification classes pertains to a particular customer;

(b) matching the link to the identification class that is tagged with that link;

(c) retrieving additional data from the matched identification class;

(d) encoding the link;

(e) transmitting from the repository to the data processing system the additional data, linked to the encoded link corresponding to the identification class from which the additional data was retrieved; and (f) adding at least a portion of the additional data to the total customer view.

14. A method of updating at least one of a plurality of physically independent databases maintained by a client, on each of which reside a plurality of data elements, wherein each of the data elements pertains to a particular entity, each of the data elements are tagged to a link corresponding to the entity to which that data element pertains, and each of said links comprise an encoded value and an unencoded value, comprising the steps of:

(a) receiving update data pertaining to at least one of the entities at a message center;

(b) encoding the link corresponding to the entity to which the update data pertains, wherein said encoded value of said link is generated based on an encoding key matched to the client;

(c) transmitting from the message center to at least one of the databases the update data and the encoded link corresponding to the entity to which the update data pertains; and (d) for those of the databases to which update data was transmitted, overlaying the update data onto the data elements that are tagged with the encoded link corresponding to the entity to which the update data pertains.

15. A data linking system to provide services to a plurality of clients, said system comprising data and a plurality of links, wherein each of said links comprises:

(a) a domain value that corresponds to a client identity; and (b) a link identifier value that corresponds to a particular entity to which each said link pertains, and the data linking system further comprises an encoding algorithm operable to encode said link identifier value in a manner dependent upon the client for whom said data is to be linked.

16. The data linking system of claim 15, wherein said data comprises a plurality of data types, and each of said links further comprises a type code value that corresponds to one of said data types.

17. The data linking system of claim 16, wherein each of said links further comprises a country code value that corresponds to one of a particular country and region.

18. A method of encoding links for use by a plurality of clients wherein each of the links comprise a domain value and a link identifier value, said method comprising the steps of:

(a) replacing the domain value with a domain value corresponding to a particular client; and (b) encoding said link identifier value in a manner specific to the particular client such that another of said clients cannot match links with said particular client.

19. The method of claim 18, wherein said step of encoding said link identifier value comprises the step of executing an encoding algorithm that utilizes a client-specific encoding key.

20. The method of claim 19, further comprising the step of distributing the encoded links to a client corresponding to the client-specific encoding key.

21. A data linking system, comprising:

(a) a plurality of data elements, wherein each of said data elements pertains to a particular entity;

(b) a plurality of links, wherein each of said links is unique over time, each of said links uniquely corresponds to a particular entity, each of said data elements is tagged with that one of said links corresponding to the entity to which said data element pertains;

(c) a repository, wherein all of said links are resident on said repository, and said repository contains a substantially comprehensive listing of all said entities from which said links are generated; and (d) a link encoding engine comprising a plurality of client-specific encoding keys, wherein a first client provided with encoded links cannot match said encoded links with a second client provided with said encoded links.

22. The system of claim 21, wherein a plurality of identification classes is resident on said repository, and each of said identification classes pertains to a particular entity, contains data concerning the entity to which it pertains, and is tagged with that one of said links corresponding to that entity.

23. The system of claim 22, wherein the data contained in each of said identification classes comprises at least one of name aliases, name change history, address aliases, address change history, alternate name and address spellings, and common name misspellings.

24. The system of claim 21, wherein each of said links comprises a domain field comprising a domain field value, and wherein said domain field value corresponds to a client identity.

25. The system of claim 24, wherein each of said links comprises a link identifier field comprising a link identifier field value, and wherein said link identifier field value corresponds to the particular entity to which said link pertains.

26. The system of claim 25, wherein each of said links comprises a type code field comprising a type code value, and wherein each said type code value corresponds to the data contained in that one of said identification classes corresponding to said link.

27. The system of claim 26, wherein each of said links comprises a country code comprising a value, and wherein each said country code value corresponds to one of a particular country and region.

28. The system of claim 26, wherein said type code field comprises a link level field comprising a link level field value and a link type field comprising a link type field value, wherein each said link level field value corresponds to one of a maintained link, a derived link, and a custom link, and wherein each said link type field value corresponds to one of a consumer link, an address link, an occupancy link, a business link, and a household link.

* * * * *